(12) United States Patent
Ando et al.

(10) Patent No.: US 8,389,894 B2
(45) Date of Patent: Mar. 5, 2013

(54) LASER PROCESSING APPARATUS AND LASER PROCESSING METHOD

(75) Inventors: Satoshi Ando, Atsugi (JP); Tomobumi Muraoka, Atsugi (JP); Takashi Nire, Atsugi (JP); Akira Matsuno, Atsugi (JP); Tadashi Kurata, Chigasaki (JP)

(73) Assignee: Phoeton Corp., Kanagawa (JP)

( * ) Notice: Subject to any disclaimer, the term of this patent is extended or adjusted under 35 U.S.C. 154(b) by 1106 days.

(21) Appl. No.: 11/916,047

(22) PCT Filed: May 16, 2006

(86) PCT No.: PCT/JP2006/309705
§ 371 (c)(1),
(2), (4) Date: Sep. 22, 2008

(87) PCT Pub. No.: WO2006/129473
PCT Pub. Date: Dec. 7, 2006

(65) Prior Publication Data
US 2009/0032510 A1    Feb. 5, 2009

(30) Foreign Application Priority Data
Jun. 1, 2005 (JP) .................................. 2005-162027

(51) Int. Cl.
*B23K 26/067* (2006.01)
(52) U.S. Cl. .......... 219/121.73; 219/121.75; 219/121.77
(58) Field of Classification Search .............. 219/121.7, 219/121.71, 121.72, 121.77, 121.73, 121, 219/75, 121.75, 121.6, 121.82
See application file for complete search history.

(56) References Cited

U.S. PATENT DOCUMENTS

| 4,467,172 A * | 8/1984 | Ehrenwald et al. ...... 219/121.68 |
| 4,950,862 A * | 8/1990 | Kajikawa ................... 219/121.8 |
| 6,219,169 B1 * | 4/2001 | Iizuka ........................... 359/234 |
| 6,365,871 B1 * | 4/2002 | Knowles et al. ........... 219/121.7 |
| 6,625,181 B1 | 9/2003 | Oshemkov et al. |
| 6,678,042 B2 * | 1/2004 | Tabirian et al. ............... 356/121 |

(Continued)

FOREIGN PATENT DOCUMENTS
JP   57-193291 A   11/1982
JP   07-051878 A   2/1995
(Continued)

OTHER PUBLICATIONS

Machine translation of Japan Patent Document No. 11-002,763, Oct. 2011.*

(Continued)

*Primary Examiner* — Geoffrey S Evans
(74) *Attorney, Agent, or Firm* — Sughrue Mion, PLLC

(57) ABSTRACT

A laser processing apparatus for processing a multitude of portions to be processed in an area to be processed in a subject W to be processed, including a laser device, a focusing or imaging device for laser beams provided by the laser device, and an arranging device for arranging the subject W to be processed, in which the subject W to be processed and the focusing or imaging device are fixed, and the subject to be processed is processed while relatively shifting the laser beams and the focusing or imaging device so that the focusing or imaging device is irradiated from different areas in the laser beam, inside and outside the area to be processed, and that cumulative laser beam irradiation time during the processing of each of the multitude of portions to be processed is equalized.

12 Claims, 30 Drawing Sheets

U.S. PATENT DOCUMENTS

| | | | |
|---|---|---|---|
| 6,787,734 B2 * | 9/2004 | Liu | 219/121.7 |
| 2002/0003320 A1 * | 1/2002 | Temple et al. | 219/121.71 |
| 2005/0017156 A1 * | 1/2005 | Ehrmann et al. | 250/216 |
| 2005/0161444 A1 * | 7/2005 | Kitai et al. | 219/121.73 |

FOREIGN PATENT DOCUMENTS

| | | | |
|---|---|---|---|
| JP | 11-002763 A * | 1/1999 | |
| JP | 3199124 | 6/2001 | |
| JP | 3211206 | 7/2001 | |
| JP | 2001-269789 A | 10/2001 | |
| JP | 2002-001561 A * | 1/2002 | |
| JP | 2002-248591 A * | 9/2002 | |
| JP | 2002-283083 A * | 10/2002 | |
| JP | 2002-290007 A | 10/2002 | |
| JP | 2002-321080 A * | 11/2002 | |
| JP | 2003-109911 A | 4/2003 | |
| JP | 2003-251477 A | 9/2003 | |
| JP | 2004-311906 A | 11/2004 | |
| JP | 2005-007476 A | 1/2005 | |

OTHER PUBLICATIONS

Machine translation of Japan Patent Document No. 2002-248,591, Oct. 2011.*

Machine translation of Japan Patent Document No. 2002-321,080, Oct. 2001.*

Machine translation of Japan Patent document No. 2002-283,083-A, Apr. 2012.*

Official Communication, dated Dec. 21, 2008, issued in corresponding German Application No. 11 2006 001 394.7, 11 pages in English and German.

* cited by examiner

FIG. 2
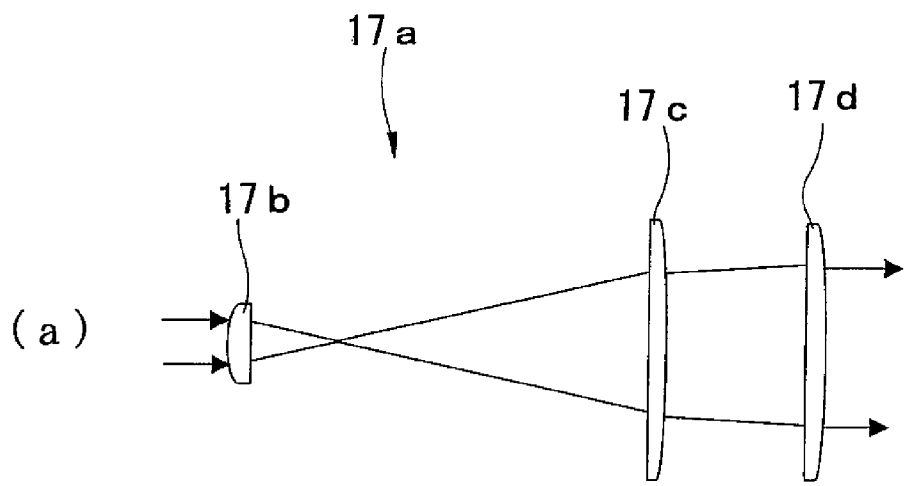
(a)
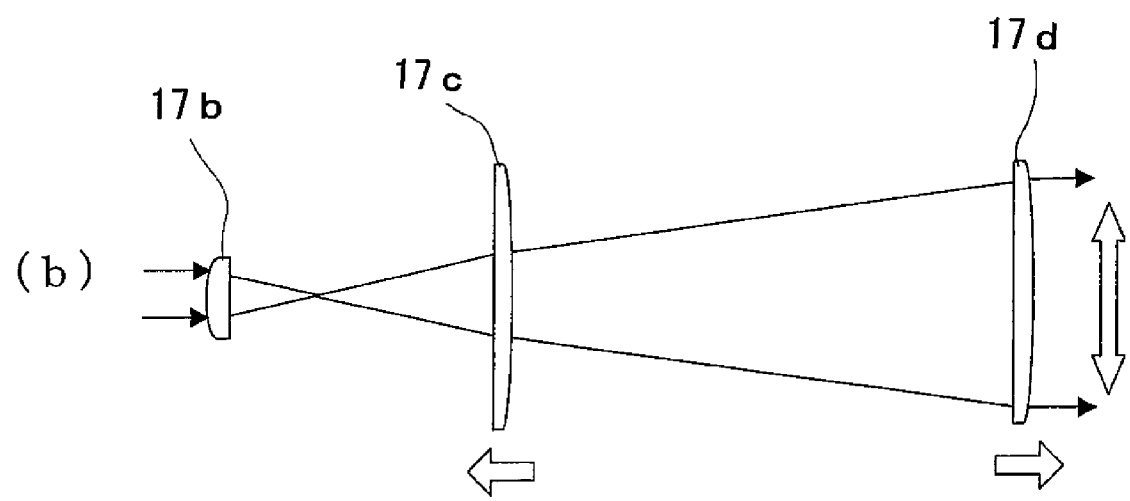
(b)

F I G. 3
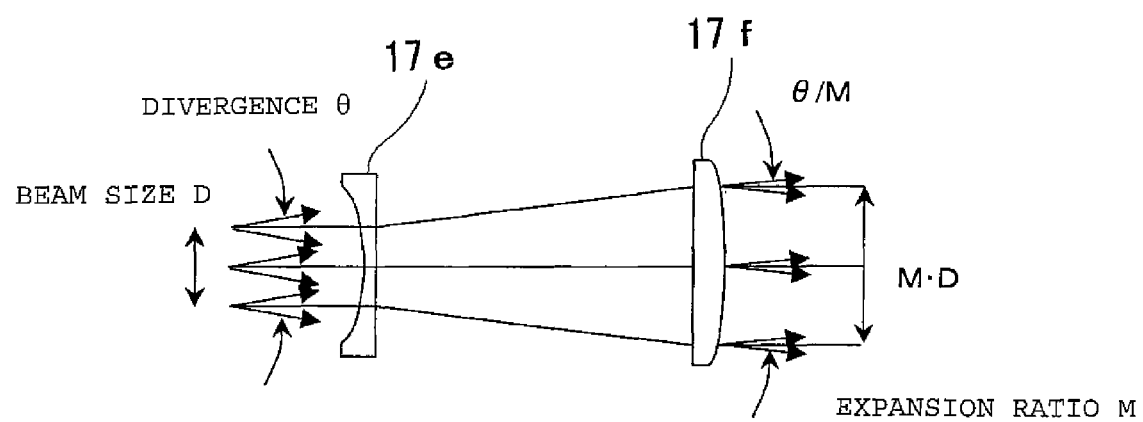

F I G. 5
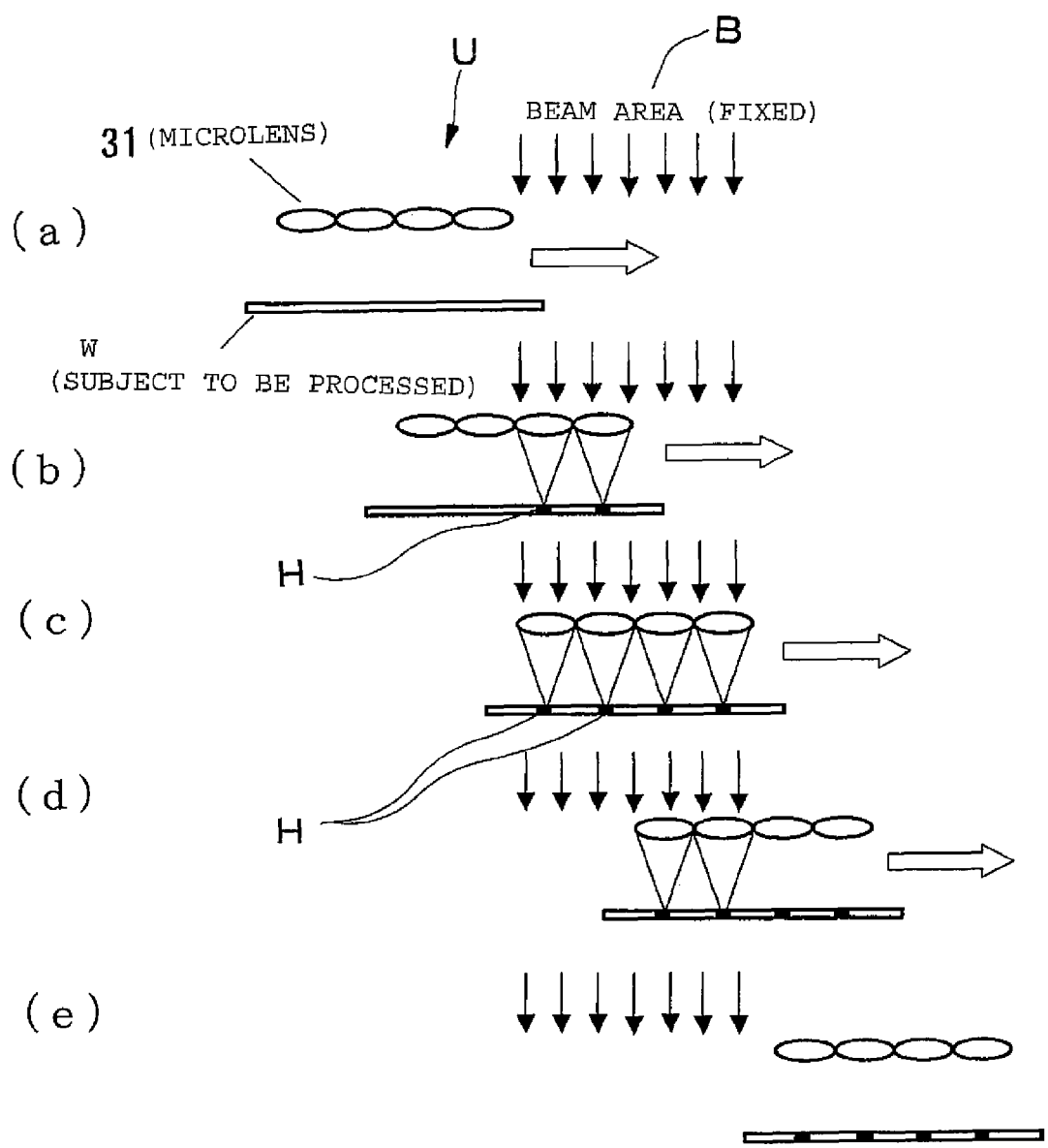

SCAN RANGE ≥ BEAM RANGE + LENS RANGE

RELATIONSHIP BETWEEN SCAN RANGE, BEAM RANGE, AND LENS RANGE

FIG. 8
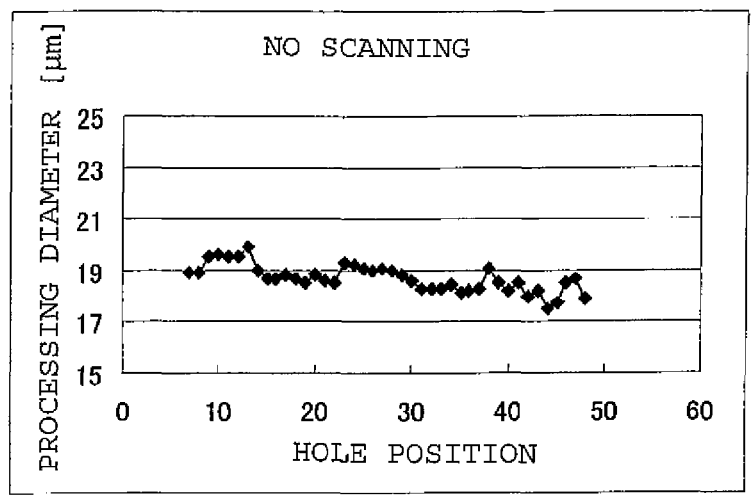
(a)
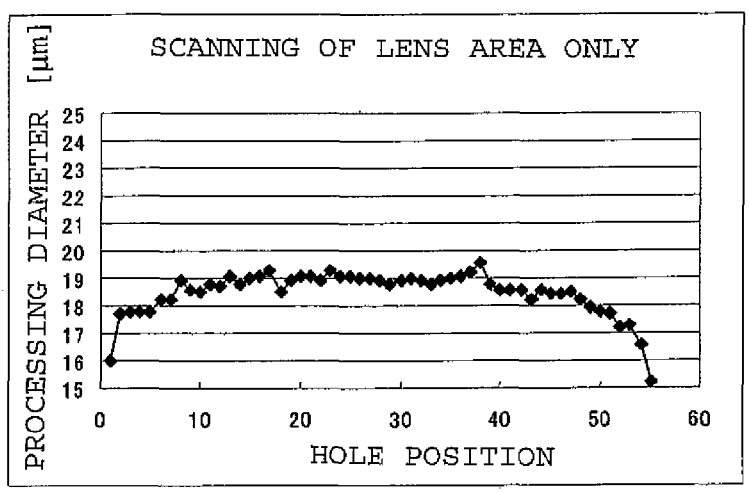
(b)
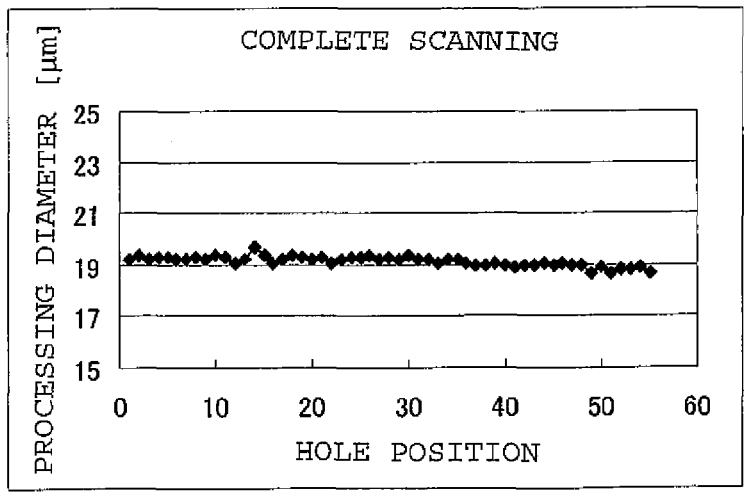
(c)

F I G. 9
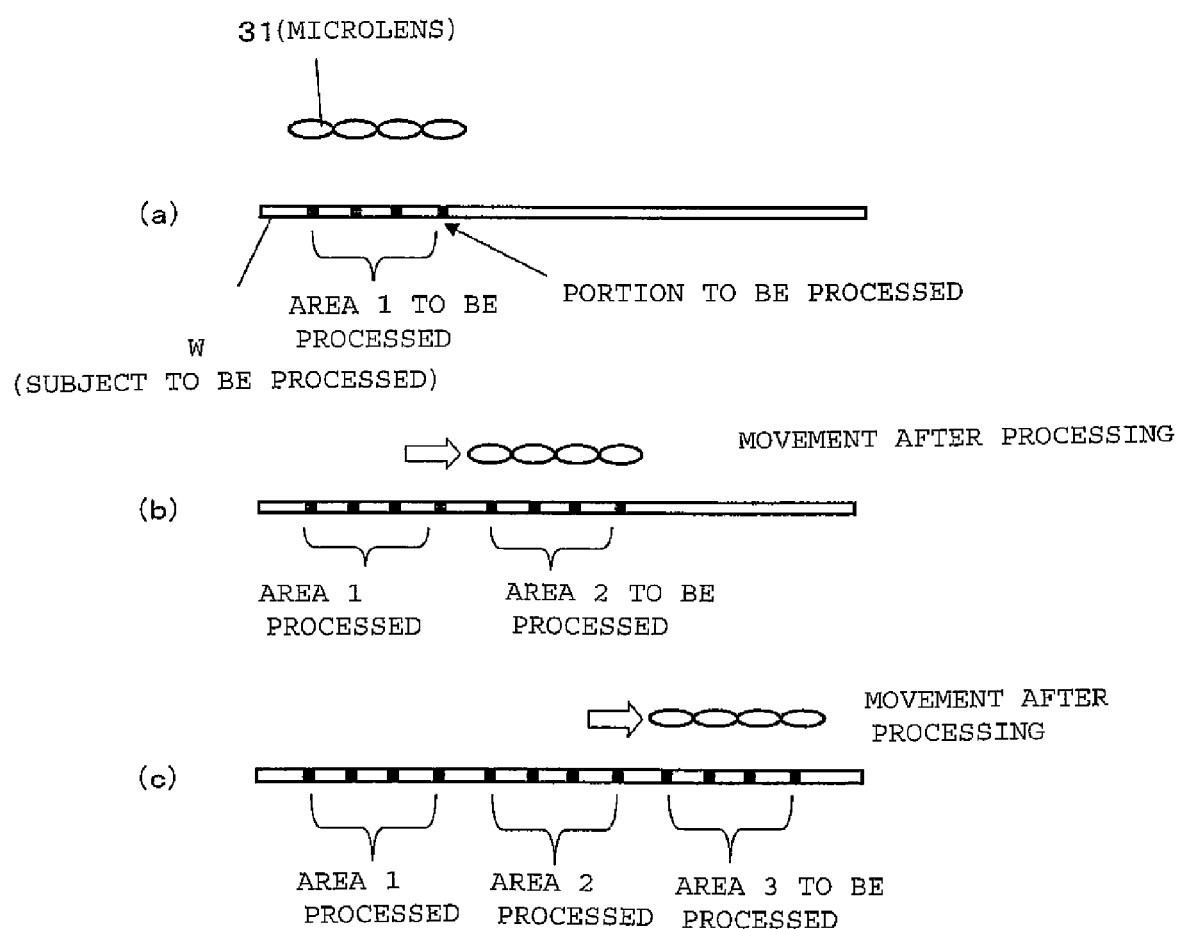

PROCESSING OF PLURALITY OF ARRANGEMENT PATTERNS

F I G. 1 2
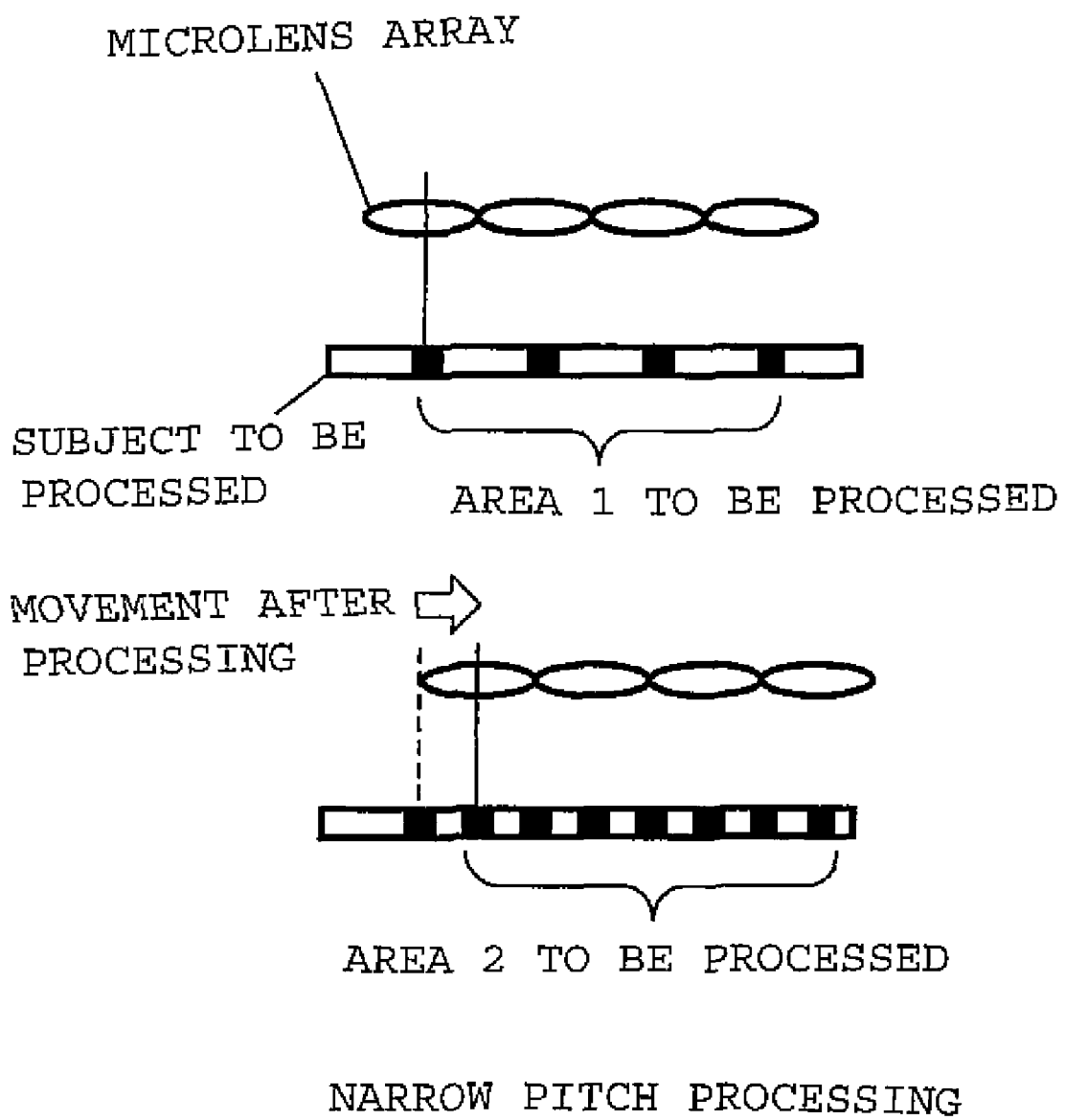

F I G. 1 3
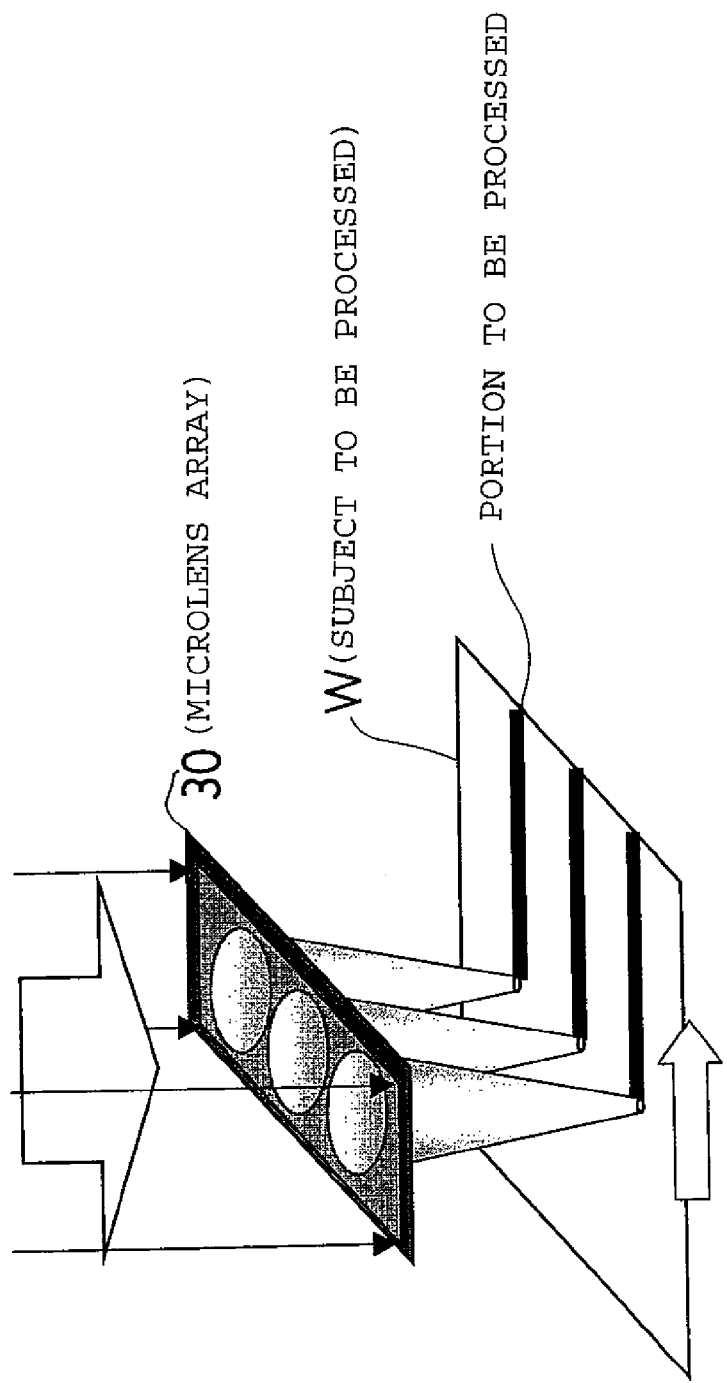

F I G. 1 4
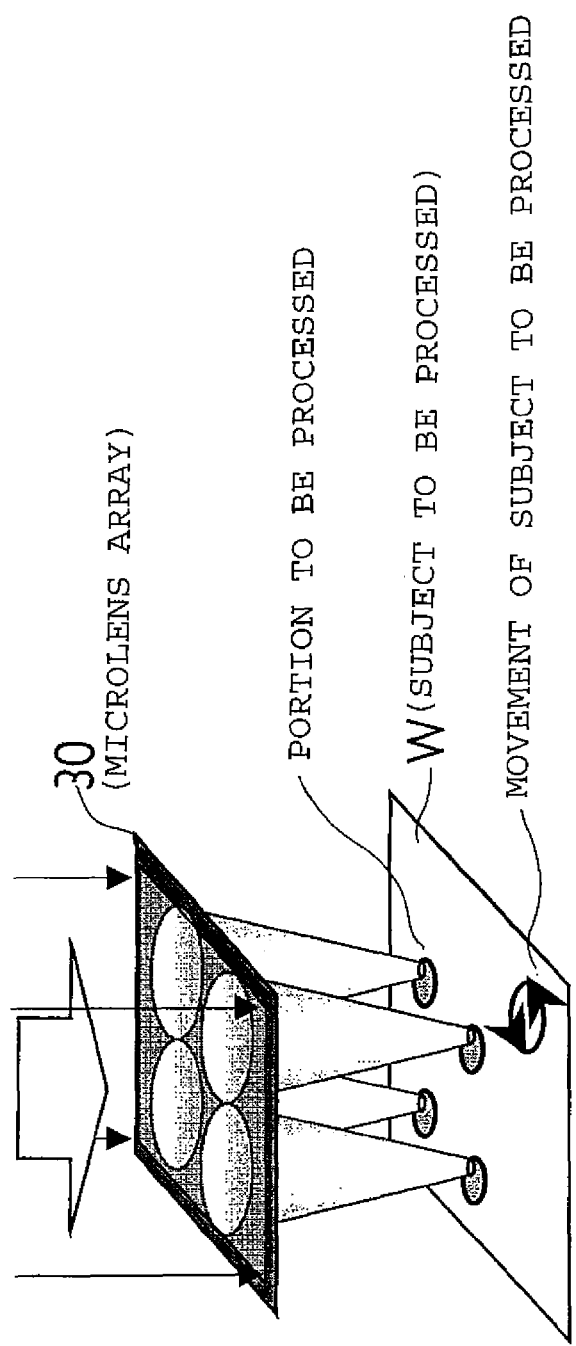

F I G. 1 7
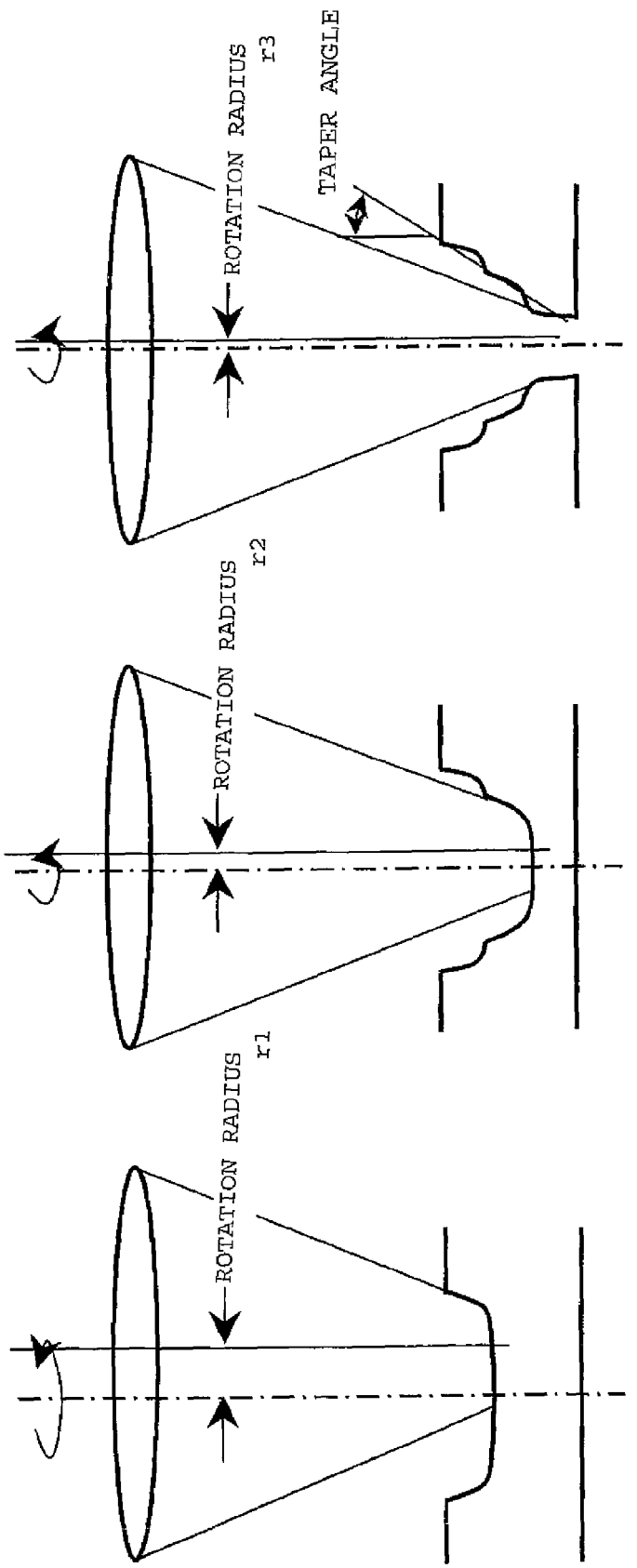

F I G. 1 9
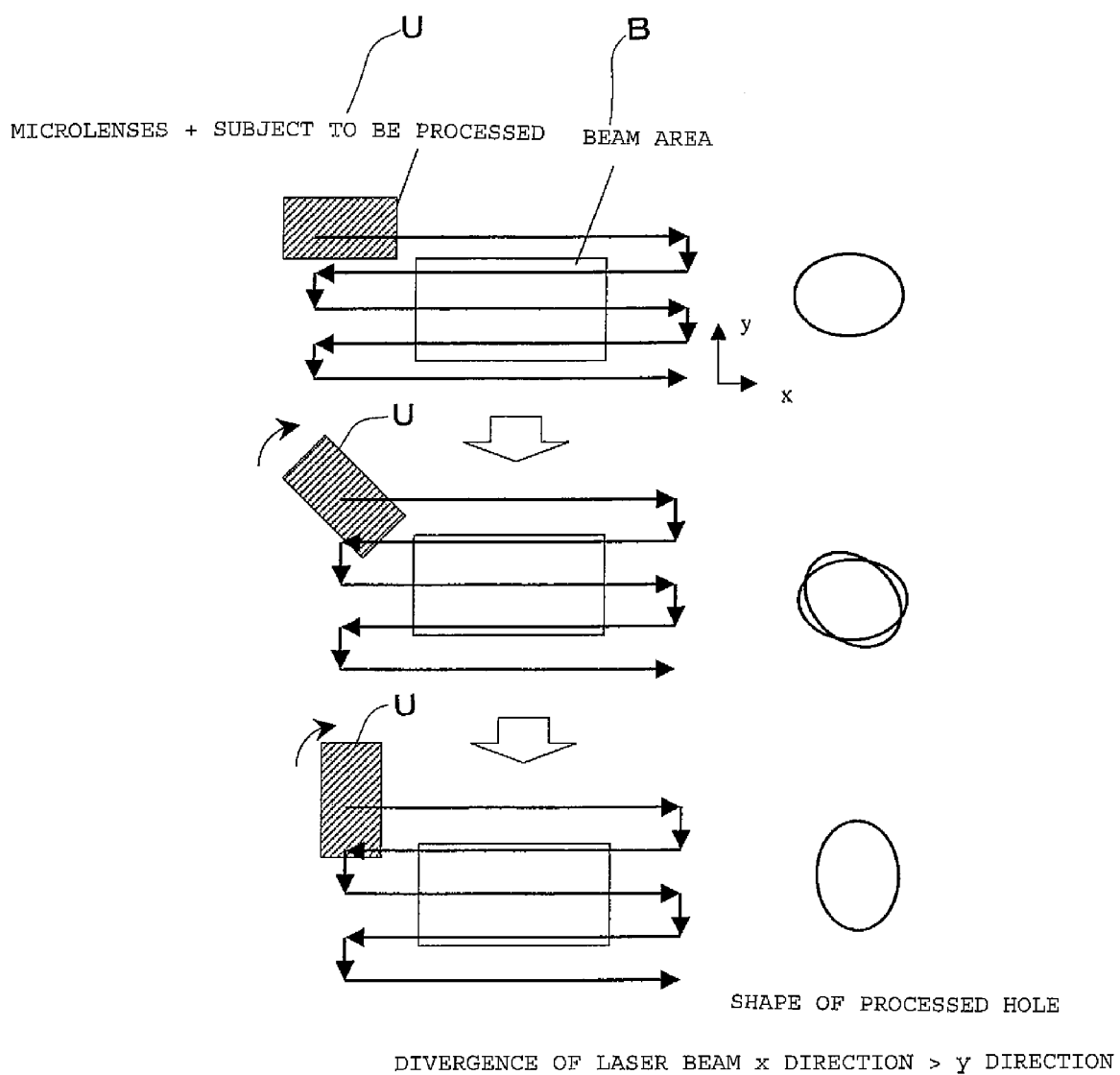

F I G. 2 1
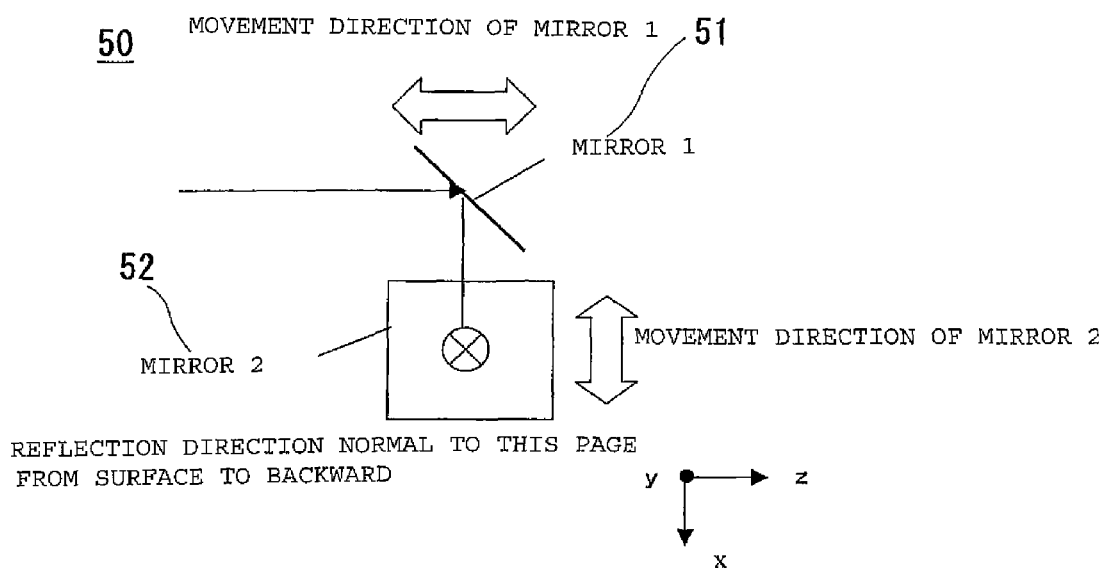

F I G. 2 5
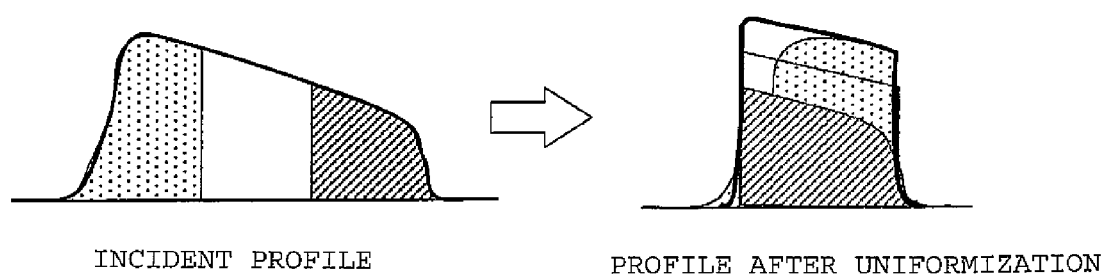
INCIDENT PROFILE        PROFILE AFTER UNIFORMIZATION

F I G. 2 6
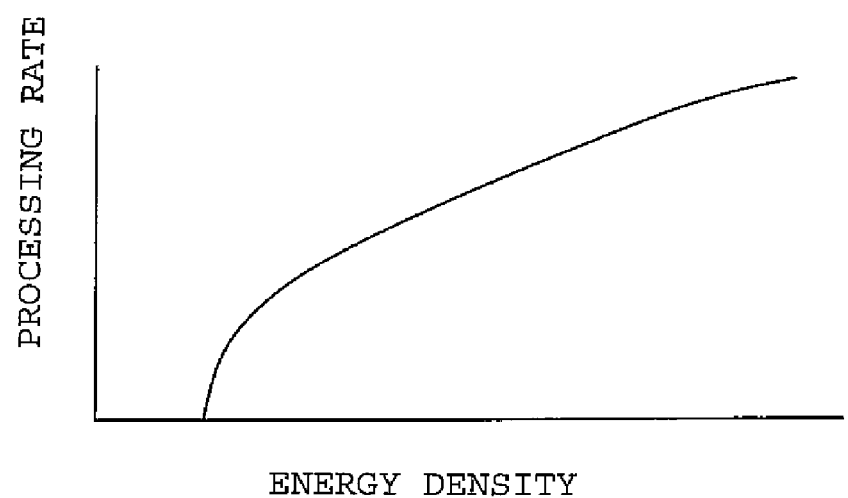

F I G. 2 7
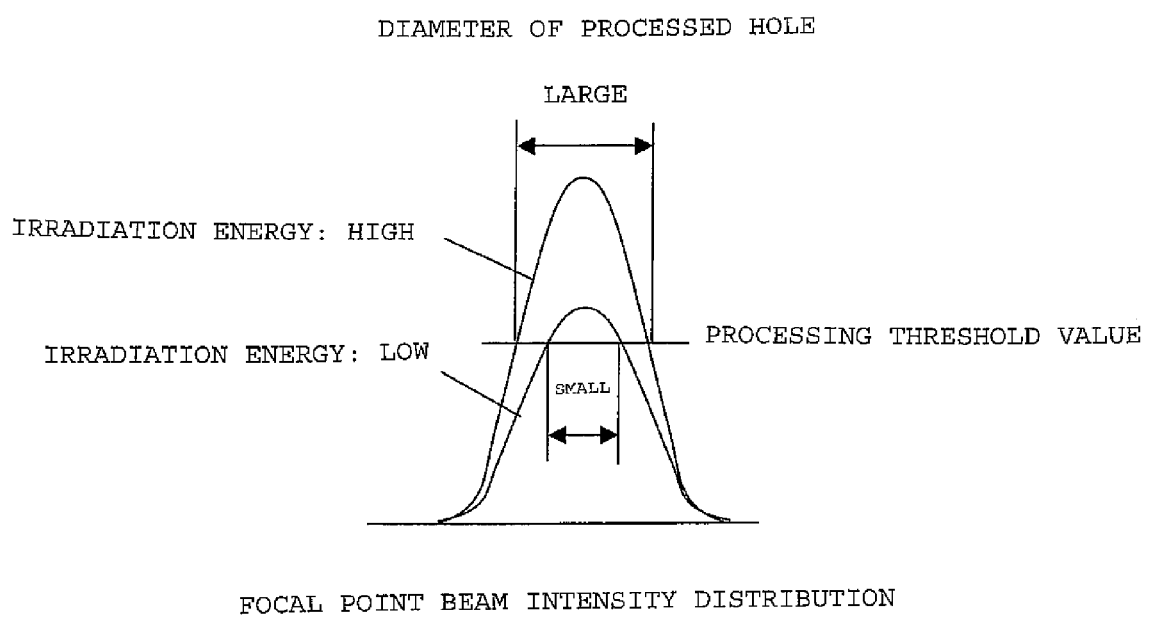

LASER PROCESSING APPARATUS AND LASER PROCESSING METHOD

TECHNICAL FIELD

The present invention relates to a laser processing apparatus and a laser processing method and, more particularly, to a laser processing apparatus and a laser processing method for performing many kinds of processing collectively on a subject to be processed by applying laser beams.

BACKGROUND ART

When a subject to be processed is drilled by applying laser beams, pulse irradiation of laser is performed many times on a subject to be processed, or processing is performed by irradiation for a fixed time.

In this process, multiple points collective processing (hereinafter referred to as a "microlens system") has been known in which a laser beam is branched into a multitude of beams by using a microlens array, and is condensed on a surface to be processed, by which many holes are formed in the subject to be processed.

When processing is performed by the aforementioned microlens system, a disadvantage that the laser beams are generally uneven at the early stage or when time has elapsed has been known.

Also, in order to perform laser processing precisely, mask projection processing has conventionally been known. The mask projection processing is a technique for performing processing by projecting a mask pattern on the surface to be processed by using a projection optical system.

In this technique, to decrease unevenness of processing, a beam homogenizer using a fly's eye integrator as shown in FIG. 19 has been used widely as a fixed type uniform illumination optical system.

In addition, a processing uniformizing technique using mechanical scan of beams has been known (for example, refer to Patent Documents 1 to 4).

Patent Document 1 describes a technique in which in the projection processing of an aperture, irradiation beam scanning to the aperture is performed by a moving mirror, by which the depth of processed bottom surface of single hole is uniformized.
Patent Documents 1: Japanese Patent No. 3199124

Patent Document 2 describes a technique in which in the projection processing of pattern mask, the pattern mask and a subject to be processed are moved in association with respect to irradiation beams, by which the processing depth is uniformized.
Patent Documents 2: Japanese Patent No. 3211206

Patent Document 3 describes a technique in which in the projection processing of an aperture, a scan system of parallel beams is formed in combination with an angularly movable mirror and a cylindrical lens, and irradiation beam scanning to the aperture is performed, by which the processing accuracy is uniformized.
Patent Documents 3: Japanese Unexamined Patent Application Publication No. 7-51878

Patent Document 4 describes a technique in which in the microlens system, in an example aiming at the performance of processing in a wide range, unevenness of irradiation can be decreased by beam scanning in an area to be processed.
Patent Documents 4: Japanese Unexamined Patent Application Publication No. 2001-269789

DISCLOSURE OF INVENTION

Problem to be Solved by the Invention

Generally, as shown in FIG. 21, since the irradiation energy density and the processing rate have a correlation, the processing rate increases with an increase in the irradiation energy.

Also, since the energy distribution of laser has a chevron shape as shown in FIG. 22 on the subject to be processed, as shown in FIG. 23, if the irradiation energy is high, the processed hole diameter increases. On the other hand, in the case of excimer laser, the laser beam has a beam profile as shown in FIG. 24. However, the laser itself has unevenness, and the unevenness of irradiation laser exerts an influence on the uniform processing. It has been known that laser beam has unevenness of energy distribution as described above, and the unevenness changes with time.

Also, as shown in FIG. 25, in the case where the divergence angle of laser beams is large when the divergence of laser beams, that is, the main beams of laser are parallel, the focal point diameter increases when the laser beams are condensed by a microlens.

When the magnitude of divergence angle of irradiation beams differs on two axes intersecting at right angles in the vertical plane with respect to the laser beam direction, the processing shape undesirably becomes of an elliptical shape.

Further, the magnitude of divergence angle of laser also changes with time in some cases, and accordingly the processing shape also changes undesirably.

For the reason of the above-described fact, various measures such as 1. measures regarding the profile of laser beams, 2. measures for uniformization at the initial stage of the divergence angle of laser beams, and 3. measures against time change of the divergence angle of laser beams are needed.

Also, to perform processing efficiently, unevenness of irradiation laser must be prevented from occurring to keep the irradiation energy of laser high and to uniformize the processing diameter at this time.

Both of the beam homogenizer of the conventional art and the techniques disclosed in Cited Documents 1 to 3 relate to mask projection processing. The mask projection processing has a big problem in terms of apparatus principle in that the energy utilization efficiency is low, and therefore high energy is needed for processing because the light in the portion to be not processed is shielded by a mask, whereby energy is thrown away.

Further, the use of these uniformizing techniques for the microlens system presents problems described below.

For the beam homogenizer using a fly's eye integrator, the beam is divided and superimposed at one place, so that angle components in multiple directions are produced, and therefore the microlens cannot condense light to a minute diameter. Therefore, the beam homogenizer cannot be used in principle.

Also, the fixed type optical system has a problem in that uniformization cannot be accomplished in the case where the beam quality deviates from the design range due to time change.

Further, the fixed type optical system has disadvantages such that the cost is high, the optical adjustment is intricate, and the energy distribution inclined in one direction cannot be improved.

FIG. 20 is an explanatory view showing the fact that for the beam homogenizer, when the incident laser beam has an energy distribution inclined in one direction, the energy distribution cannot be uniformized.

In the technique in Cited Document 1, beam scanning only in one-dimensional direction is performed. However, since the intensity distribution of actual excimer laser has a two-dimensional distribution, it is difficult to perform processing of uniform diameter by beam scanning only in one-dimensional direction. Also, this technique has a disadvantage that a change in divergence angle of laser beams cannot be accommodated.

The technique in Cited Document 2 is a technique in which processing is performed while the mask and the subject to be processed are moved relatively in the direction opposite to each other so as to match the transfer magnification ratio, which is a technique unique to the mask projection processing.

In the technique in Cited Document 3, to form parallel light, the beams applied to the mirror must have no width. Realistically, however, the beam has a width, so that completely parallel light cannot be formed.

Therefore, in the microlens system, the processing diameter cannot be decreased.

Also, in order to make the laser intensity used for processing beams having a narrow width on the mirror, the energy density must be very high on the mirror, and therefore the mirror is damaged. Therefore, this technique is unrealistic.

The technique in Cited Document 4 is of a microlens system. However, the range of beam scanning is only the area to be processed.

In the case where processing is performed by scanning the irradiation beams while overlapping it in the area to be processed only, in the end portion of the area to be processed, the number of cycles of beams irradiation or the time of beam irradiation decreases. Therefore, the processing diameter becomes smaller than the central portion, so that it is difficult to perform drilling with high accuracy.

Also, Cited Document 4 does not disclose a concrete apparatus configuration for beam scanning.

Further, Cited Document 4 describes that an influence exerted by the divergence angle of laser beams can be eliminated by an unstable resonator type laser. Actually, however, even if the unstable resonator type laser is used, there is an influence exerted by the divergence angle. Unless uniformization processing is performed, the processing shape becomes elliptical undesirably.

An object of the present invention is to provide a laser processing apparatus and a laser processing method in which in a process of processing a multitude of portions to be processed in a subject to be processed by pulse irradiation of laser performed many times or irradiation for a fixed time, processing is performed by using a microlens, a hologram element, or the like as a focusing or imaging means, and the processing diameter or the processing shape can be uniformized.

Another object of the present invention is to provide a laser processing apparatus and a laser processing method in which for laser beams having a nonuniform beam quality at the early stage and when time has elapsed as well, the processing diameter or the processing shape can be uniformized.

Still another object of the present invention is to provide a laser processing apparatus and a laser processing method in which drilling can be performed efficiently.

Means for Solving Problems

The inventors conducted studies earnestly to solve the above-described problems, and obtained a knowledge that the beam profile and the divergence angle of laser beams exert an influence on the processing diameter and the processing shape. The inventors found that the above-described problems can be solved by taking measures for the uniformization of the beam profile and the divergence angle of laser beams at the initial stage and measures against the time change, and finally completed the present invention.

The above-described problems are solved by a laser processing apparatus for processing a multitude of portions to be processed in an area to be processed in a subject to be processed, including a laser device; a focusing or imaging means for laser beams emitted from the laser device; and an arranging means for arranging the subject to be processed, in which the subject to be processed and the focusing or imaging means are fixed, and the subject to be processed is processed while relatively shifting the laser beams and the focusing or imaging means so that the focusing or imaging means is irradiated from different areas in the laser beam, inside and outside the area to be processed, and that cumulative laser beam irradiation time during the processing of each of the multitude of portions to be processed is equalized.

Also, the above-described problems are solved by a laser processing apparatus for processing a multitude of portions to be processed in an area to be processed in a subject to be processed, including a laser device; a focusing or imaging means for laser beams emitted from the laser device; and an arranging means for arranging the subject to be processed, in which while the subject to be processed and the focusing or imaging means are moved relatively, the subject to be processed is processed while relatively shifting the laser beams and the focusing or imaging means so that the focusing or imaging means is irradiated from different areas in the laser beam, inside and outside the area to be processed, and that cumulative laser beam irradiation time during the processing of each of the multitude of portions to be processed is equalized.

The portion to be processed described herein means one processing point that is processed by the focusing or imaging of laser beam or one continuous processing shape that is processed by relatively moving the subject to be processed and the focusing and imaging means.

Thus, according to the laser processing apparatus in accordance with the present invention, since the focusing or imaging means shifts relatively until the laser beams completely pass through over the focusing or imaging means, the number of cycles of beam irradiation or the time of beam irradiation is uniformized at all positions of the area to be processed, so that all processing diameters can be uniformized.

Also, since the configuration is made such that the unit scanning is performed while overlapping in the two-dimensional direction, even if the intensity distribution of laser beam is a two-dimensional distribution, uniform processing can be performed. Thus, according to the laser processing apparatus in accordance with the present invention, a multitude of portions to be processed can be processed into a uniform and arbitrary shape.

The relative shift of the laser beams with respect to the focusing or imaging means during processing is two-dimensional or three-dimensional.

If the apparatus further includes a rotating mechanism for rotating the arranging means and the focusing or imaging means around the optical axis, the subject to be processed is irradiated with laser beams uniformly regardless of the change in the divergence angle of laser beams, so that the processing point can be kept into a complete round shape.

By moving the focusing or imaging means for the laser beams or a new focusing or imaging means to an area to be processed separate from the area to be processed in the subject to be processed, and by performing new processing successively following the processing, a wide area to be processed can be processed.

The laser device of the present invention includes two independent beam expanders that independently change beam sizes in two directions intersecting at right angles in the vertical plane with respect to the laser beams and make the principal rays parallel. In the case where the divergence angles of the laser beams emitted from the laser differ in two directions intersecting at right angles in the vertical plane with respect to the laser beams, the divergence angles of the laser beams incident on the focusing or imaging means can be aligned by the beam expanders.

Also, at least one of the two beam expanders is provided with a zoom mechanism. In the case where the divergence angle of the laser beams incident on the focusing or imaging means changes, the divergence angles can be aligned easily by this zoom mechanism.

It is further preferable that the configuration be made such that the zoom mechanism is provided with an automatic zoom adjusting mechanism.

It has been described above that the portion to be processed has a complete round shape. However, the portion to be processed may be of an elliptical shape.

Further, the laser processing apparatus is preferably configured so as to include a monitor device for monitoring the divergence angle of laser beams incident on the focusing or imaging means.

The monitor device has a control mechanism for keeping the divergence angles of the laser beams in two directions intersecting at right angles in the vertical plane with respect to the laser beams at a fixed ratio by using the zoom mechanism provided in the beam expander.

The change in divergence angle of the laser beams can be detected by the monitor device, and by operating the monitor device and the automatic zoom mechanism of the expander in association, the divergence angle of the laser beams can be adjusted automatically.

The above-described problems can be solved by a laser processing method for processing a multitude of portions to be processed in an area to be processed in a subject to be processed, having a laser device; a focusing or imaging means for laser beams emitted from the laser device; and a means for arranging the subject to be processed, and including a first step in which the subject to be processed and the focusing or imaging means are fixed; and a second step in which the subject to be processed is processed while relatively shifting the laser beams and the focusing or imaging means so that the focusing or imaging means is irradiated from different areas in the laser beam, inside and outside the area to be processed, and that cumulative laser beam irradiation time during the processing of each of the multitude of portions to be processed is equalized.

Further, the above-described problems can be solved by a laser processing method for processing a multitude of portions to be processed in an area to be processed in a subject to be processed, having a laser device; a focusing or imaging means for laser beams emitted from the laser device; and a means for arranging the subject to be processed, and including a first step in which the subject to be processed and the focusing or imaging means are moved; and a second step in which while the subject to be processed and the focusing or imaging means are moved relatively, the subject to be processed is processed while relatively shifting the laser beams and the focusing or imaging means so that cumulative laser beam irradiation time during the processing of each of the multitude of portions to be processed is equalized.

In the above-described laser processing method, it is preferable that the relative shift of the laser beams with respect to the focusing or imaging means during processing in the second step be two-dimensional or three-dimensional.

Also, it is preferable that the method further include a step of rotating the subject to be processed and the focusing or imaging means, which were fixed in the first step, with the optical axis direction of the laser beams being the axis in the second step.

Further, it is preferable that the method further include a third step in which the focusing or imaging means for the laser beams or a new focusing or imaging means is moved to an area to be processed separate from the area to be processed in the subject to be processed after the second step, and successively include the second step.

Effect of the Invention

As described above, the laser processing apparatus and the laser processing method in accordance with the present invention include the focusing or imaging means and the arranging means for the subject to be processed, and are configured so that the arranging means is controlled so as to perform predetermined movement with respect to the laser beams to uniformize the processing diameter or the processing shape of the portion to be processed formed in the subject to be processed.

Further, by providing the mechanism for relatively shifting the focusing or imaging means and the arranging means for the subject to be processed, the portion to be processed can be processed into an arbitrary shape.

Further, the laser processing apparatus and the laser processing method in accordance with the present invention include two independent beam expander mechanisms that change the beam sizes of laser beams in two directions intersecting at right angles in the vertical plane with respect to the laser beams and make the principal rays parallel, and can align the divergence angles of laser beams, by which the processing diameter or the processing shape of the portion to be processed formed in the subject to be processed can be uniformized.

Also, the laser processing apparatus and the laser processing method in accordance with the present invention have the zoom mechanism in at least one expander mechanism. Therefore, even when the magnitude of the divergence angle of laser beams changes with time, the divergence angle of laser beams incident on the focusing or imaging means is kept constant by the zoom mechanism, so that the processing diameter or the processing shape of the portion to be processed formed in the subject to be processed can be uniformized.

BRIEF DESCRIPTION OF DRAWINGS

FIG. 2 is a flowchart showing a laser processing process;

FIG. 3 is an explanatory view showing an expander mechanism;

FIG. 5 is an explanatory view of the relationship between a beam area and a lens area with respect to a subject to be processed;

FIG. 8 is graphs showing the state of processing diameter obtained by various processing methods;

FIG. 9 is an explanatory view of the relationship between microlenses and an area to be processed, showing a modification of example 1;

FIG. 12 is an explanatory view showing an example of narrow pitch processing, showing a modification of example 1;

FIG. 13 is an explanatory view showing an example of linear processing, showing processing by the relative movement of a substance to be processed and a microlens array;

FIG. 14 is an explanatory view showing an example of circular processing, showing processing by the relative movement of a substance to be processed and a microlens array;

FIG. 17 is an explanatory view showing an example of taper processing, showing processing by the relative movement of a substance to be processed and a microlens array;

FIG. 19 is an explanatory view showing a scanning pattern in example 2;

FIG. 21 is an explanatory view showing a configuration of a mirror scan unit in example 3;

FIG. 25 is an explanatory view showing the fact that in the case where the incident laser beam has an energy distribution inclined in one direction, a beam homogenizer cannot uniformize the energy distribution;

FIG. 26 is a graph showing the correlation between irradiation energy density and processing rate;

FIG. 27 is a graph showing an energy distribution on a subject to be processed;

Figure 1:
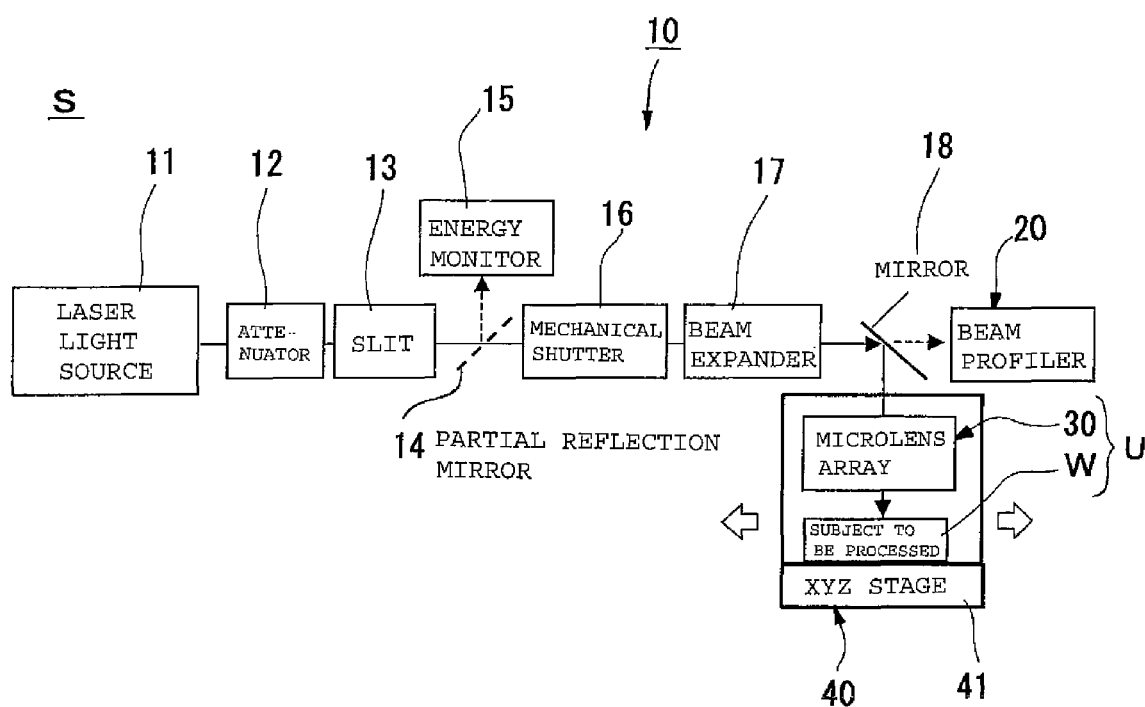
FIG. 1 is an explanatory view showing a configuration of a laser processing apparatus in accordance with example 1 of the present invention.

EXPLANATIONS OF LETTERS OR NUMERALS 10 laser device
11 laser light source
12 attenuator
13 slit
14a, 14b partial reflection mirror
15 energy monitor
16 shutter
17 beam expander
17a zoom mechanism
17b to 17f cylindrical lens
18 mirror
20 beam profiler
30 microlens array
31 microlens
40 work adjusting means
41 stage
50 mirror scan unit
51 first mirror
52 second mirror
60 divergence monitor
61 circular slit
62 lens
63 two-dimensional sensor
B beam area
R lens area
SC scan range
S laser processing apparatus
U unit
W subject to be processed

BEST MODE FOR CARRYING OUT THE INVENTION

One embodiment of the present invention will now be described with reference to the accompanying drawings. The members, arrangement, and the like explained below do not restrict the present invention, and, needless to say, various changes and modifications can be made without departing from the sprit and scope of the present invention.

Figure 4:
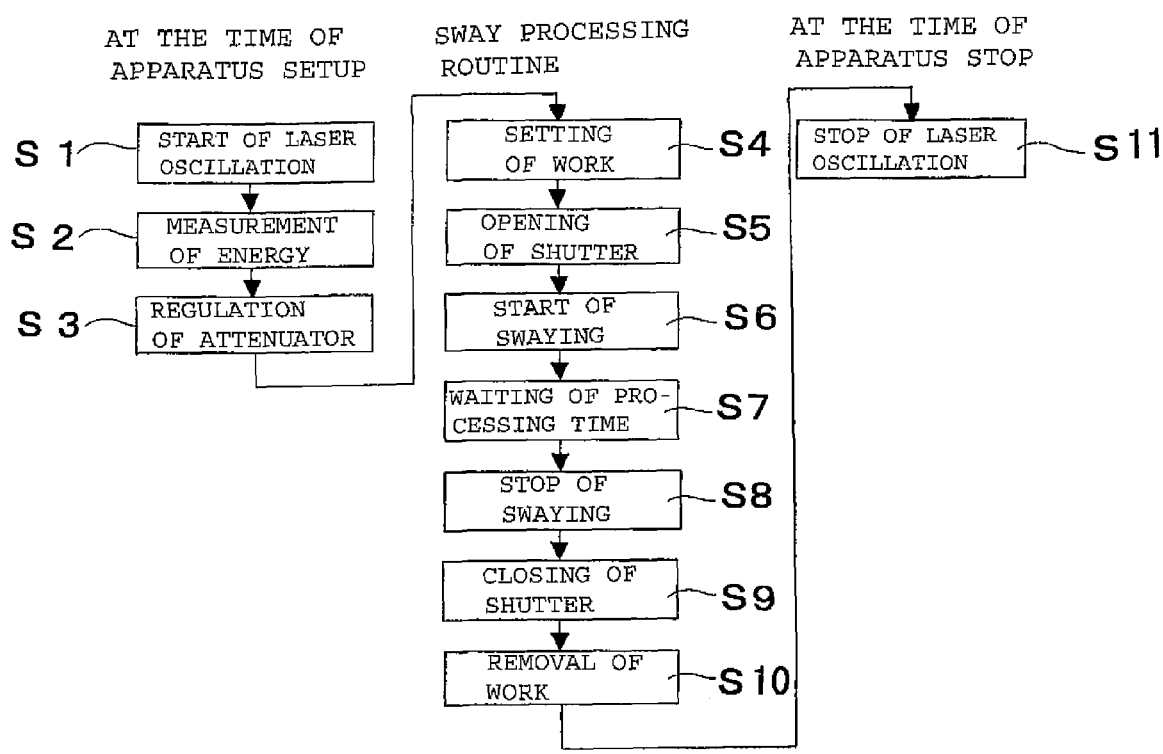
FIG. 4 is an explanatory view showing another example of an expander mechanism.
Figure 6:
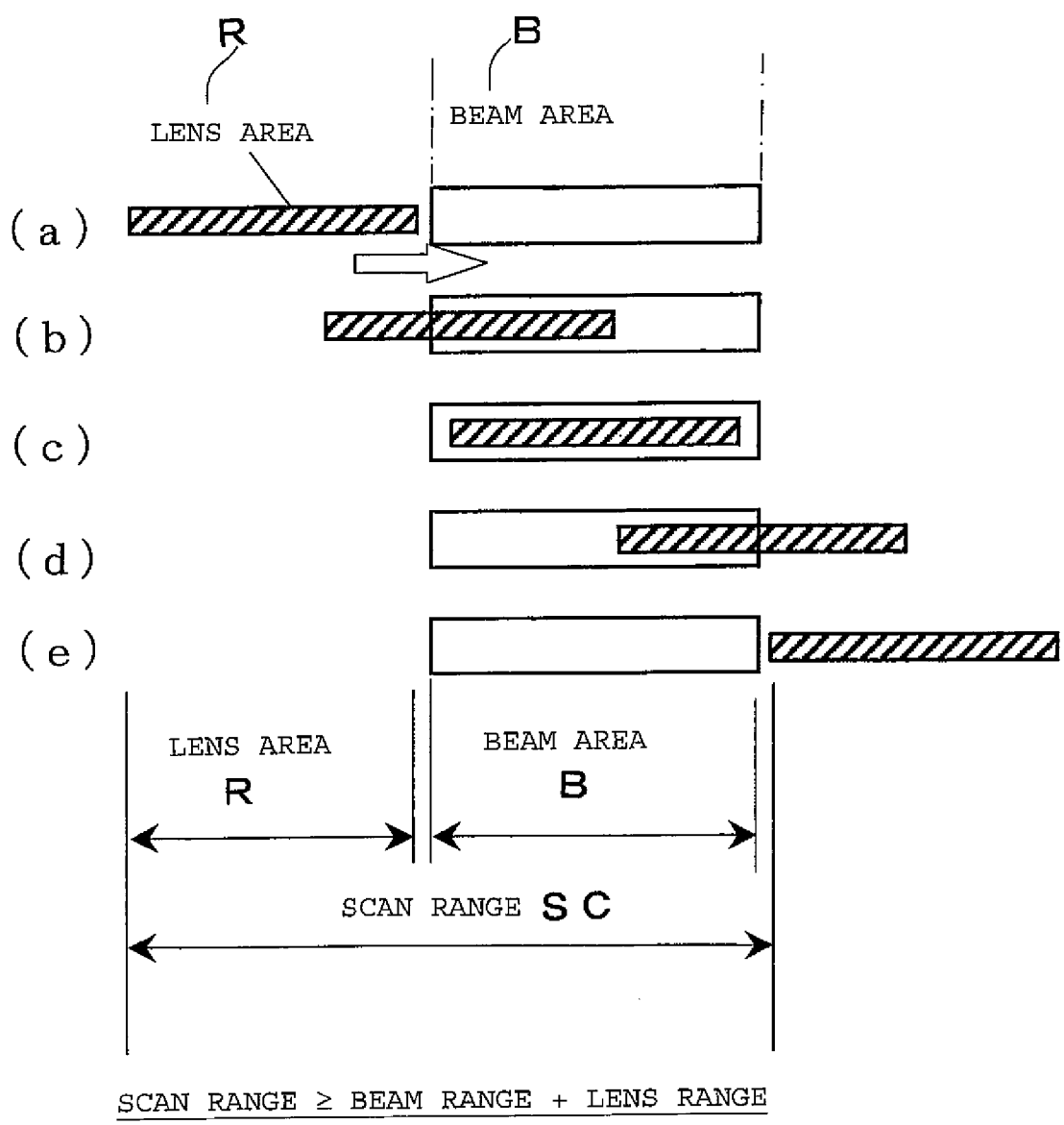
FIG. 6 is an explanatory view of the relationship between a beam area and a lens area with respect to a subject to be processed.
Figure 7:
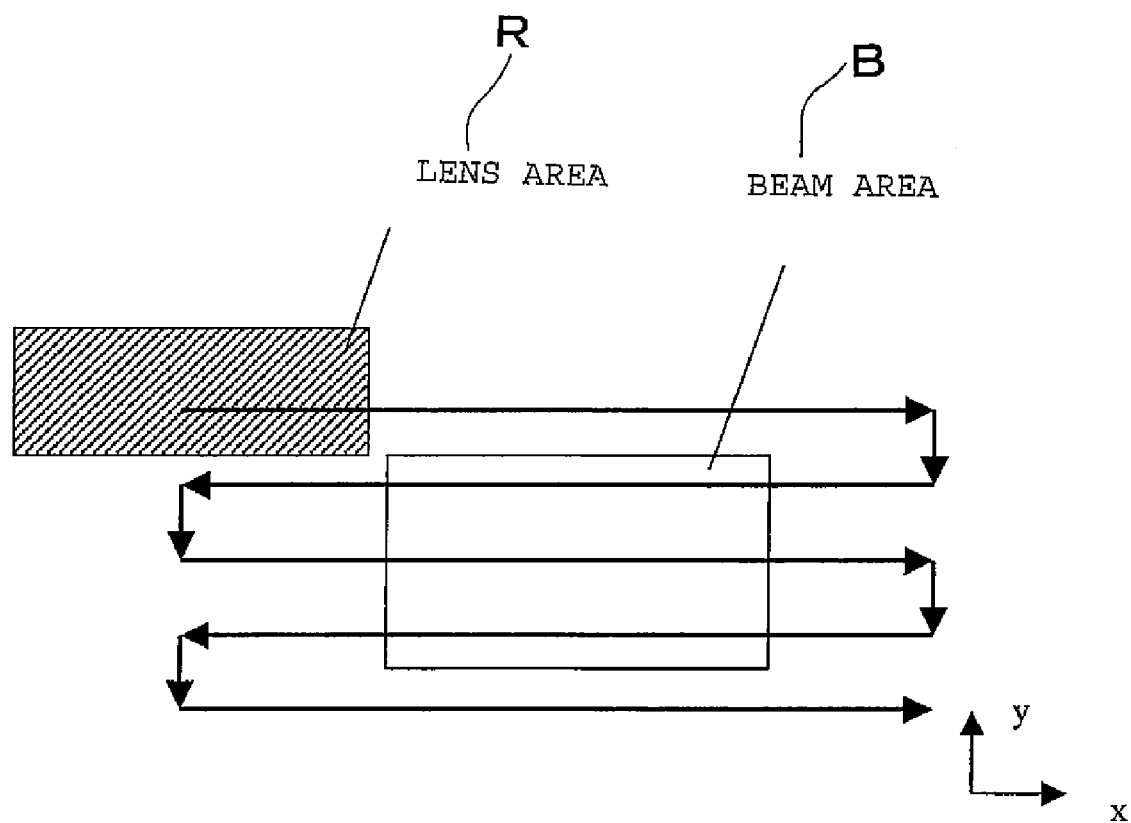
FIG. 7 is an explanatory view of the relationship between a beam area and a lens area with respect to a subject to be processed.

FIGS. 1 to 8 show one embodiment in accordance with the present invention. FIG. 1 is an explanatory view showing the configuration of a laser processing apparatus in accordance with example 1 of the present invention, FIGS. 2 and 3 are explanatory views showing an expander mechanism, FIG. 4 is a flowchart showing a processing process, FIGS. 5 to 7 are explanatory views of the relationship between a beam area and a lens area with respect to a subject to be processed, and FIG. 8 is graphs showing the state of processing diameter obtained by various processing methods.

The laser processing apparatus of this embodiment is configured so that multiple points collective laser processing having a processing diameter uniformization mechanism is performed. In this description, the term "processing" is used mainly for drilling, but used in meaning to include annealing, etching, doping, film forming, and the like.

EXAMPLE 1

As shown in FIG. 1, a laser processing apparatus S of this embodiment includes a laser device 10, a beam profiler 20, a microlens array 30 serving as a focusing means, and a work adjusting means 40, which is an arranging means for a subject W to be processed. A unit U is formed by a microlens array 30 arranged over the work adjusting means 40 and the subject W to be processed.

The laser device 10 of example 1 includes a laser light source 11, an attenuator 12, a slit 13, a partial reflection mirror 14, an energy monitor 15, a shutter (mechanical shutter) 16, a beam expander 17, and a mirror 18.

The laser light source 11 emits laser beams according to the control of a control section, not shown, and sends the laser beams to the beam expander 17 via the attenuator 12, the slit 13, and the shutter 16. The laser beams passing through the slit 13 are partially reflected by the partial reflection mirror 14, and are guided to the energy monitor 15. The energy monitor of this example measures the energy of laser beams. As the energy monitor 15, a publicly known energy monitor can be used.

By providing a control system in the energy monitor 15, a feedback mechanism for controlling energy in association with the attenuator 12 can be provided. As an example of the attenuator, a type utilizing a change in transmittance caused by the incident angle of beams to a wedge substrate can be cited. By controlling the wedge substrate angle by a stepping motor, the transmittance of energy can be adjusted.

As the laser light source 11 of this example, an excimer laser provided with an unstable resonator is used. However, the laser light source 11 is not limited to this, and a $CO_2$ laser, a YAG laser, or any other laser may be used. Also, an injection-locked type laser may be used. The laser device is preferably provided with an energy regulating mechanism of outgoing beams.

The attenuator 12 of this example is a filter for regulating the beam intensity, and the transmittance thereof is variable. The attenuator 12 is preferably provided with a mechanism for automatically changing over the transmittance. If the transmittance is changed over automatically, an effect is achieved that energy can be controlled in association with the energy monitor.

The slit 13 of this example cuts out a laser beam size necessary for processing. A portion having high laser beam quality passes through the slit 13.

The partial reflection mirror 14 of this example is arranged on the light path to guide some of the laser beams to the energy monitor 15.

The shutter (mechanical shutter) 16 of this example is arranged on the light path to shield the laser beams by being opened at the processing time of the subject W to be processed and by being closed at the non-processing time thereof.

The beam expander 17 of this example is configured so that the beam expansion ratios in two directions intersecting at right angles in the vertical plane with respect to the laser beam are changed independently, and the principal rays of the laser beam become parallel.

In this example, the beam expander 17 is provided with a zoom mechanism 17a shown in FIG. 2 so that the divergence angle (referred also to as beam divergence) of laser beams can be adjusted in two directions intersecting at right angles in the vertical plane with respect to the laser beam. The zoom mechanism 17a includes cylindrical lenses 17b, 17c and 17d. The distance between the cylindrical lenses 17c and 17d is configured so that the zoom ratio can be adjusted continuously from the state shown in FIG. 2(*a*) to the state shown in FIG. 2(*b*). When the zoom ratio is changed, the positions of the cylindrical lenses 17c and 17d are changed in association so that the principal rays of the formed laser beams are kept parallel with each other. The zoom mechanism 17a uses a publicly known technique in which, for example, the distance between the lenses are adjusted.

For the laser such as the excimer laser, the divergence angle of laser beams often differs along two axes in a plane normal to the laser beam direction. In this case, even if the incident beams are condensed, the focal point has an elliptical shape.

To correct this phenomenon, the beam expander for independently changing the beam sizes along two axes in a plane normal to the laser beam direction is provided for the laser processing apparatus S of this example so that the beam expansion ratios can be changed independently in two directions. Thereby, the divergence angles of laser beams incident on a focusing or imaging means are equalized along two axes in a plane normal to the laser beam direction by which the processing shape can be made a complete round shape.

Also, even in the case where the divergence angle of laser beams changed with time, the divergence angles of laser beams incident on the focusing or imaging means are equalized along two axes in a plane normal to the laser beam direction by which the processing shape can be made a complete round shape.

The beam expander 17 may be configured so as to use a concave cylindrical lens 17e and a convex cylindrical lens 17f as shown in FIG. 3.

Also, to further enable the adjustment of optical axis, the holder of the beam expander 17 is preferably provided with a position and angle adjusting mechanism. As the position and angle adjusting mechanism, for example, a lens holder provided with position and angle adjustment, which is on the market, can be used.

In addition, an intensity distribution optical part for changing the intensity distribution and the like part may be provided.

The mirror 18 of this example is used to change the direction of laser beams. Two or more mirrors 18 are preferably provided to adjust the optical axis.

Further, the laser processing apparatus S of this example has a beam profiler 20. The beam profiler 20 takes in some of the laser beam reflected by the mirror 18 and measures the beam diameter and a spatial intensity distribution of laser beams.

The measurement value of the beam profiler 20 is fed back to the beam expander 17, by which an always fixed laser beam can be applied to the subject W to be processed.

The microlens array 30 is an accumulation of many microlenses 31 (refer to FIG. 3). In this example, as the microlens array 30, a refracting lens, a Fresnel's lens, binary optics, or the like is used. The microlens array is not limited to focusing equivalent to that of a general spherical lens, and a microlens array capable of forming an arbitrary intensity distribution is included. Also, as the focusing or imaging means, a hologram element etc. may be used in addition to the microlens array.

By perpendicularly applying laser beams to the plurality of microlenses 31 serving as the focusing or imaging means, the subject W to be processed is drilled. The microlens array 30 of this example is configured so as to have a mechanism for adjusting the height, windage, and angle of microlenses 31 so that the optical system can be regulated.

The laser processing apparatus S of this example further has a gas flow mechanism, not shown. The gas flow mechanism flows a gas to prevent pollutants scattered by processing from adhering to the optical system when the subject W to be processed is processed. A mechanism for allowing the gas to flow and a mechanism for exhausting the gas on the opposite side are provided. As the mechanism for allowing the gas to flow, for example, a means for blowing air with a fan, or a means for supplying gas such as air, nitrogen, or helium from a bomb or factory piping can be adopted, and an exhaust port or a suction port is provided on the opposite side. The exhaust port and the suction port can be formed, for example, by a gas exhaust pump.

The work adjusting means 40 of this example consists of a stage 41 that can move in the XYZ directions to change the processing position as the arranging means for arranging the subject W to be processed, and is provided with a height and angle adjusting mechanism for optical adjustment and the like.

When the subject W to be processed is placed on the stage 41, the control section, not shown, moves the stage 41 in the horizontal direction so that the stage 41 comes to the optical axis position of the irradiation lens system. By the control section, the laser light source is controlled to emit the laser beams.

Since the area of irradiation pattern has been specified in advance, the control section divides the value of output signal of an energy meter, not shown, by the area of irradiation pattern to calculate the energy density. Then, the control section controls the laser light source so that this calculated energy density takes a predetermined value.

Also, the stage 41 of this example consists of an vacuum stage so that the subject W to be processed can be gripped. The stage is formed of a material that is not damaged by beams penetrating at the time of processing, such as stainless steel or aluminum.

As the stage 41, a stage that is integral with the subject W to be processed, the microlens array 30, and the holding mechanism thereof and has a stroke at least longer than the sum of the beam area and the size of the microlens array 30 is used.

Preferably, the stage 41 has a stroke longer than the distance obtained by adding the irradiation beam area to the double of the size of the microlens array 30.

As the stage 41, a stage such that the running accuracy is high, that is, the angular deflection at the time of stage movement is small should be used.

The laser processing apparatus S of this example may be configured so that the speed of the stage 41 and the number of scanning cycles of the subject to be processed are controlled according to the change of profile of laser beams. Alternatively, the laser processing apparatus S may be configured so that the energy intensity of laser beams is controlled according to the change of profile of laser beams.

Next, the laser processing process using the laser processing apparatus configured as described above is explained with reference to FIG. 4.

First, when a switch, not shown, is turned on to start the laser processing apparatus, the whole of the apparatus is energized. The data such as the processing diameter for the subject W to be processed is given in advance to the control section. Subsequently, the laser light is emitted form from laser light source 11 in the state in which the shutter 16 is closed (Step S1). Next, energy is measured with the energy monitor 15 (Step S2). Thereafter, the transmittance of the attenuator 12 is adjusted based on the energy measured in Step S2 so that energy suitable for the processing of the subject W to be processed is provided (Step S3). At this time, it is checked that energy fluctuations within fixed time are small and the oscillation is stable.

Next, the subject W to be processed is set on the stage 41 (Step S4). The set position is a position deviating from the irradiation beam area.

Then, the shutter 16 is opened (Step S5), and the scanning of the unit U consisting of the microlens array 31 and the subject W to be processed is started (Step S6).

In Step S6, the unit U scans to perform processing under predetermined processing conditions. The predetermined processing conditions differ depending on the subject to be processed, and are determined based on the stage speed, scanning range, and the like.

At this time, the stage 41 is moved (swayed) in the X and Y directions, and the unit U is allowed to pass through the irradiation beam area to perform drilling.

The details of the movement (swaying) of the stage 41 in Step S6 are shown in FIGS. 5 to 7.

As shown in FIG. 5, a beam area B is fixed, and the unit U consisting of the microlens array 30 and the subject W to be processed passes through this beam area B.

In FIG. 5, to clarify the state of drilling, the microlenses 31 that are components of the microlens array 30 are shown.

First, as shown in FIG. 5(a), the unit U is positioned at a position deviating from the beam area B. Then, as shown in FIGS. 5(b) to 5(e), the stage 41 is moved, by which the unit U is moved in the direction of the arrow in FIG. 5.

As the unit U passes through the beam area B, holes H are formed in the subject W to be processed. In this example, as shown in FIG. 5(e), scanning is performed until the beam area B completely passes through over the microlenses 31.

FIG. 6 is a schematic view showing the relationship between a lens area R of the microlenses 31 and the beam area B and a scan range SC.

As shown in FIG. 6(a), at first, the lens area R is positioned on the outside of the beam area B.

Then, the stage 41 is moved. Thereby, as shown in FIGS. 6(b) to 6(e), the lens area R passes through the beam area B.

As shown in FIG. 6, the scan range SC is at least wider than the sum of the beam area B and the lens area R.

As shown in FIG. 6, scanning is performed until the beam area B completely passes through over the microlenses 31.

FIG. 7 shows a scanning pattern of the unit U (lens area R).

The scanning of the unit U is performed with a two-dimensional pattern as shown in FIG. 7 unless the pattern of the microlens array 30 is one-dimensional arrangement.

The reason for this is that the beam intensity distribution of excimer laser etc. is a two-dimensional distribution in processing strictly uniform diameters.

When the scanning of two-dimensional pattern shown in FIG. 7 is performed, in each scan, as shown in FIGS. 5 and 6, scanning is performed until the beam area B completely passes through over the microlenses 31.

Thus, by scanning the subject W to be processed while overlapping in the two-dimensional direction, a multitude of points are drilled uniformly and collectively in the subject W to be processed.

As shown in FIG. 4, in Step S7, since the processing time has been set in advance, the subject W to be processed is processed for predetermined processing time by using a timer.

When the processing in Step S7 is finished, the unit U stops at a position deviating from the irradiation beam position (Step S8). Thereafter, the shutter 16 is closed (Step S9), and the subject W to be processed is removed (Step S10).

Finally, the oscillation of the laser light source 11 is stopped (Step S11).

In such a manner, the subject W to be processed is processed.

FIG. 8 is graphs showing how the processing diameter differs depending on processing method of "no scanning", "scanning of lens area only", and "complete scanning".

FIG. 8(a) shows a processing diameter obtained by a method of fixed processing (that is, "no scanning"), FIG. 8(b) shows a processing diameter obtained by a processing method in which beam scanning is performed in the processing area only (that is, "scanning of lens area only"), and FIG. 8(c) shows a processing diameter obtained by the laser processing method of this example (that is, "complete scanning").

As shown in FIG. 8(a), it is found that with the method of fixed processing, the processing range is narrow, and variations in processing diameter are large. Also, as shown in FIG. 8(b), it is found that with the processing method in which beam scanning is performed in the processing area only (scanning of lens area only), variations in processing diameter in the end portion is large.

On the other hand, as shown in FIG. 8(c), it is found that with the laser processing method of this example, that is, the "complete scanning" method, holes can be drilled with a fixed processing diameter at any position of the subject W to be processed.

The reason for this is that in the laser processing method of this example, since scanning is performed until the beam area B passes through completely over the microlenses 31, at any location of the subject W to be processed, the processing time is fixed, and at any location of the subject W to be processed, processing is performed under the same conditions.

Also, as shown in FIG. 7, since the scanning is performed with the two-dimensional pattern, the intensity distribution of laser beams is two-dimensional. Irradiation is accomplished by being overlapped, so that uniform drilling can be performed.

Figure 10:
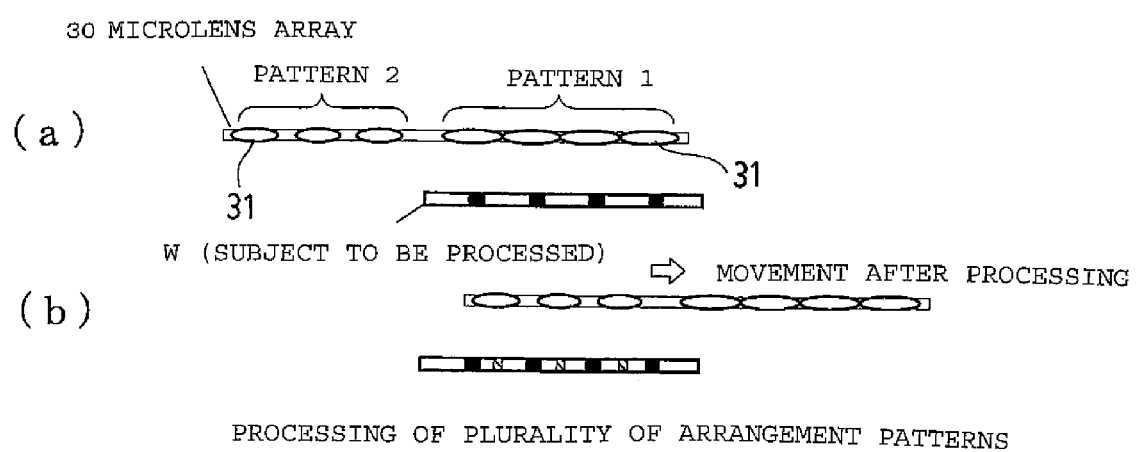
FIG. 10 is an explanatory view showing a modification of a microlens array, showing a modification of example 1.
Figure 11:
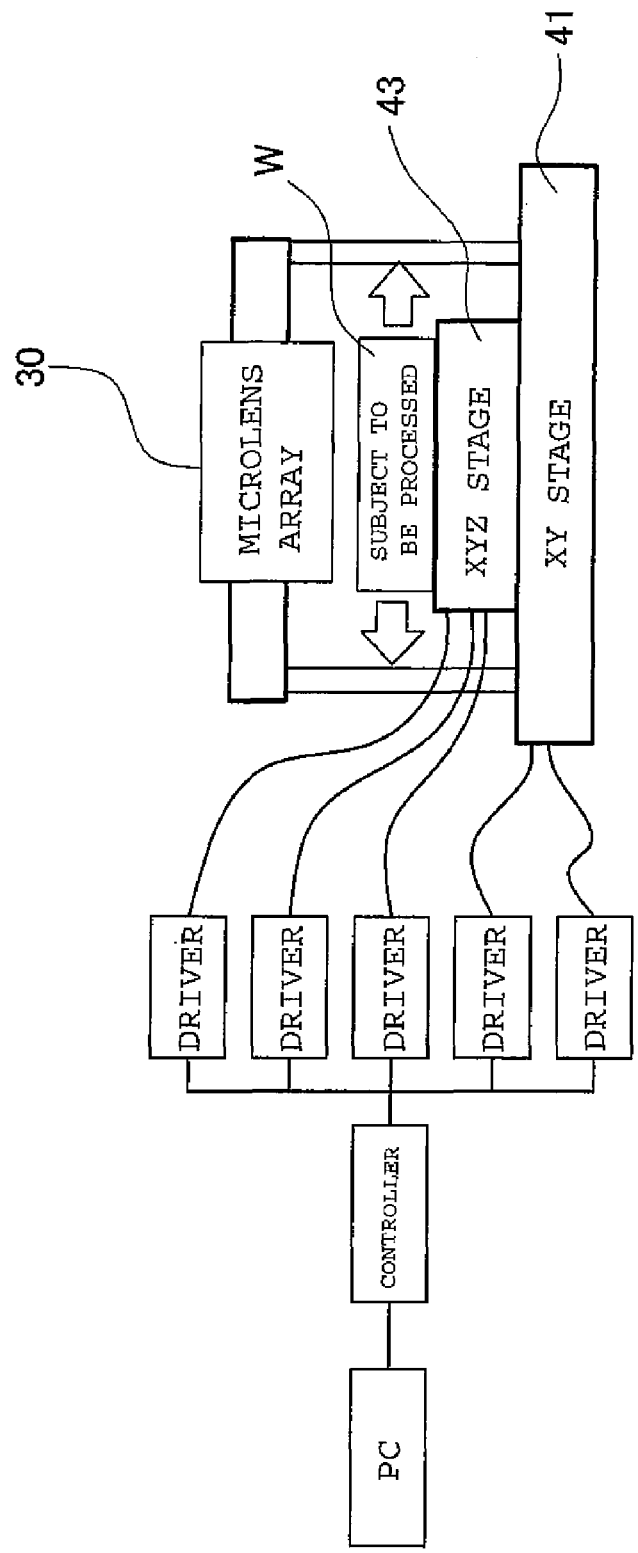
FIG. 11 is an explanatory view of a work adjusting means, showing a modification of example 1.

FIGS. 9 to 17 are explanatory views showing modifications of example 1. FIG. 9 is an explanatory view of the relationship between the microlens and the area to be processed, FIG. 10 is an explanatory view showing a modification of the microlens array, FIG. 11 is an explanatory view of the work adjusting means, and FIG. 12 is an explanatory view showing an example of narrow pitch processing.

The work adjusting means 40 shown in FIG. 11 is provided with stages capable of changing the relative position of the subject W to be processed, the microlens array 30, and the holding mechanism thereof (work adjusting means etc.). That is to say, as shown in FIG. 11, on the stage 41 capable of moving in the XY directions, a stage 43 capable of moving in the XYZ directions is further provided.

The stage 41 is formed by a two-axis linear stage etc., and the stage 43 is formed by a three-axis linear stage etc. The stages 41 and 43 are controlled by a motion controller, and operation parameters are set by a PC, not shown. The controller for the stage 43 preferably has a circular interpolation function. As the motion controller, a publicly known controller such as UMACJ-Turbo manufactured by Delta Tau Syatems, Inc. can be used.

According to the work adjusting means 40 shown in FIG. 11, a multitude of processed portions can be processed at arbitrary intervals by changing the relative position after the processing of the area to be processed and by processing a new area to be processed.

Thereby, processing of a wide area to be processed and processing of a narrow space of the portion to be processed can be performed.

That is to say, a method for processing the wide area to be processed as shown in FIG. 9 can be used. Specifically, after the microlens array 30 (the microlenses 31) has been moved relatively with respect to the subject W to be processed by using the stage 41 capable of being moved in the XY directions which is shown in FIG. 11 (the stage 41 is moved in the XYZ directions in the example shown in FIG. 1, but moved in the XY directions in this example), the relative position of the subject W to be processed and the microlens array 30 is fixed. Thereafter, the range of the beam area B of the fixed subject W to be processed and microlens array 30 is scanned by using the stage 43 capable of being moved in the XYZ directions, by which an area 1 to be processed is processed.

After the area 1 to be processed has been processed in this manner, the microlens array 30 is moved to an area 2 to be processed with respect to the subject W to be processed by using the stage 41 capable of being moved in the XY directions, and the relative position of the subject W to be processed and the microlens array 30 is fixed, by which the processing of the area 2 to be processed is performed.

By repeating the above-described process, the processing of the wide area to be processed is performed.

FIG. 10 shows a modification of the microlens array 30. The microlens array 30 shown in FIG. 10 has two patterns: a configuration in which the microlenses 31 are disposed adjacently without a gap (pattern 1) and a configuration in which the microlenses 31 each having a diameter different from that of pattern 1 are disposed with a predetermined gap being provided therebetween.

By changing over the area of the microlens array 30 to the area in which the microlens arrangement pattern is different, processing can be performed with a plurality of processing patterns.

In the case where processing is performed by using the microlens array 30 in this example, first, as shown in FIG. 10(a), drilling in portions of pattern 1 is performed.

Next, as shown in FIG. 10(b), drilling in portions of pattern 2 is performed between the portions to be processed having been drilled in portions of pattern 1.

Since the microlens 31 constituting the portion of pattern 2 has a smaller diameter than the microlens 31 constituting the portion of pattern 1, the hole formed by the portion of pattern 2 is smaller than the hole formed by the portion of pattern 1.

Thus, the subject W to be processed can be drilled with the plurality of arrangement patterns.

Also, as shown in FIG. 12, after first processing has been performed, second processing is performed without moving the subject to be processed by moving the microlens array 30. By processing the area to be processed in an overlapping manner, processing is performed between the portions to be processed, by which narrow pitch processing can be performed.

By the work adjusting means 40 shown in FIG. 11, processing is performed while the subject W to be processed, the microlens array 30, and the holding mechanism thereof are relatively moved arbitrarily. Thereby, a multitude of portions to be processed can be processed into arbitrary shapes.

Figure 15:
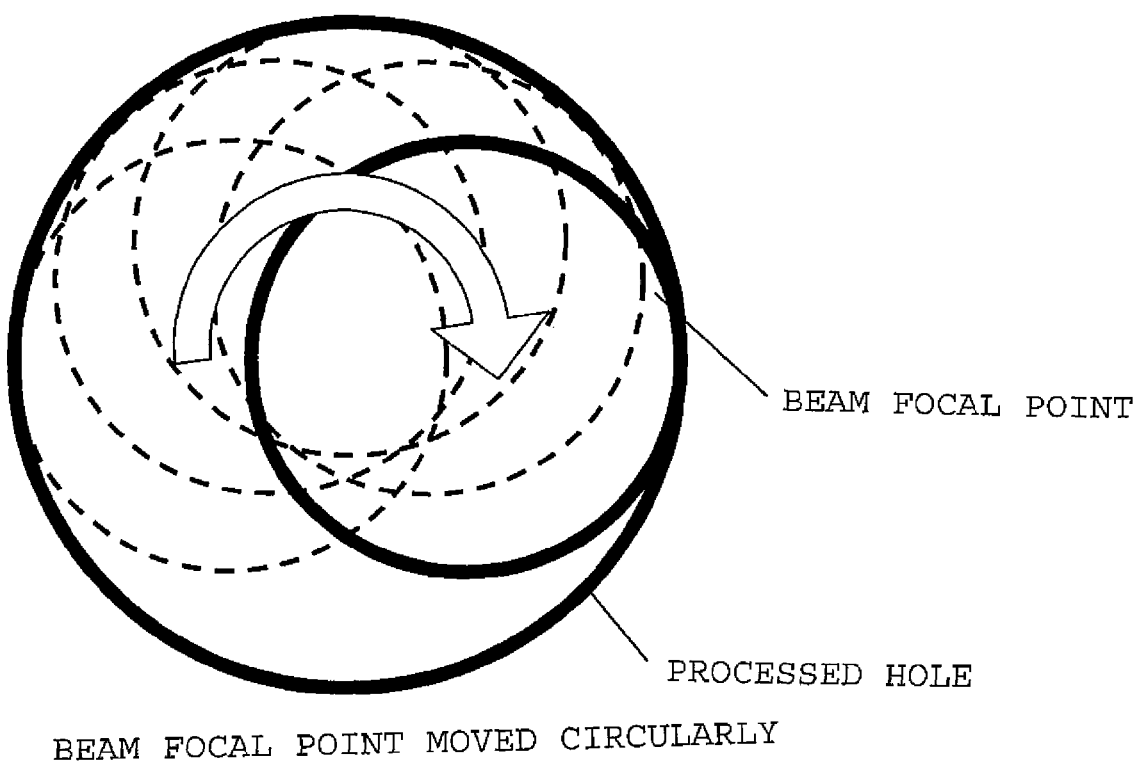
FIG. 15 is an explanatory view showing an example of circular processing shown in FIG. 14.
Figure 16:
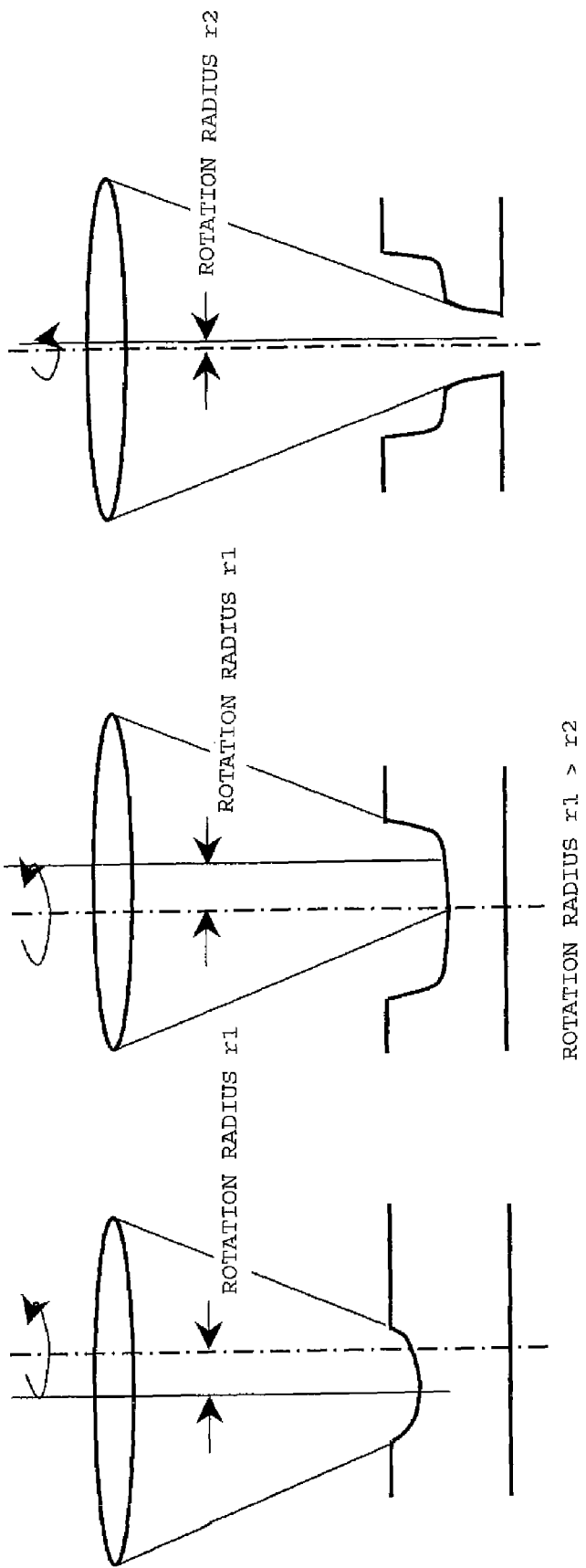
FIG. 16 is an explanatory view showing an example of counterbore processing, showing processing by the relative movement of a substance to be processed and a microlens array.

FIGS. 13 to 17 show processing by the relative movement of the substance to be processed and the microlens array. FIG. 13 is an explanatory view showing an example of linear processing, FIGS. 14 and 15 are explanatory views showing an example of circular processing, FIG. 16 is an explanatory view showing an example of counterbore processing, and FIG. 17 is an explanatory view showing an example of taper processing.

As shown in FIG. 13, by performing processing while the subject W to be processed, the microlens array 30, and the holding mechanism thereof (the work adjusting means etc.) are relatively moved one-dimensionally, a multitude of linear portions to be processed can be formed.

Also, FIG. 14 shows an example in which processing is performed while the subject W to be processed, the microlens array 30, and the holding mechanism thereof are relatively moved in a circular form, and FIG. 15 shows the beam focal point and processed hole at this time. That is to say, as shown in FIG. 15, the beam focal point is moved in a circular form (as indicated by the outline type arrow) while the subject W to be processed, the microlens array 30, and the holding mechanism thereof (the work adjusting means 40) are relatively moved.

Thereby, a circular portion having an arbitrary processing diameter larger than the focal point diameter of the microlens can be processed, and processing of a pattern having a different processing diameter can be performed without exchanging the microlenses to those having a different focal point diameter.

Also, in the case where the processing shape becomes elliptical due to the change with time of the divergence angle of laser beams, the processed hole can be adjusted to a complete round by correcting the relative movement path of the subject W to be processed, the microlens array 30, and the holding mechanism thereof.

Further, when processing is performed while the subject W to be processed, the microlens array 30, and the holding mechanism thereof (the work adjusting means 40) are relatively moved in a circular form, by changing the rotation radius during the processing time, the taper angle and the three-dimensional shape in the depth direction of the processed hole can be adjusted. FIG. 16 shows an example of counterbore processing. The counterbore processing is performed as described below. When processing is performed while the subject W to be processed, the microlens array 30, and the holding mechanism thereof (the work adjusting means 40) are relatively moved in a circular form, at the early stage of processing, circular movement with a large rotation radius r1 is performed to form a processed hole having a large processing diameter, and at the later stage of processing, circular movement with a small rotation radius r2 is performed to form a small processed hole in the central portion.

FIG. 17 shows an example in which when processing is performed while the subject W to be processed, the microlens array 30, and the holding mechanism thereof (the work adjusting means 40) are relatively moved in a circular form, at the early stage of processing, circular movement with a large rotation radius r1 is performed, and the taper angle of processed hole is adjusted by decreasing the rotation radius gradually (r2, r3). For ease of understanding, in FIG. 17, a stepped cross-sectional shape is shown. However, by changing the rotation radius continuously, the cross-sectional shape can be made smooth. Similar processing can be provided by changing the rotation radius from small one to large one.

Also, by controlling the conditions of relative movement of the subject W to be processed, the microlens array 30, and the holding mechanism thereof and the beam irradiation conditions during the processing time, the processing rate of the subject to be processed can be adjusted, and therefore fine adjustment of a three-dimensional shape can be made easily. The conditions of relative movement referred to in this description include the movement speed of the stage 43 and the scanning pattern, and the beam irradiation conditions include the energy density and the oscillation frequency. Although the example of circular processing has been shown in this description, the shape of relative movement is not subject to any restriction, and the present invention can be applied to the processing of an arbitrary shape such as an elliptical shape, polygonal shape, and free curve.

FIGS. 18 to 23 are explanatory views of the laser processing apparatus S in accordance with other examples. In these examples, the same symbols are applied to the same members, the same arrangement, and the like as those in the above-described example, and the explanation thereof is omitted.

EXAMPLE 2

Figure 18:
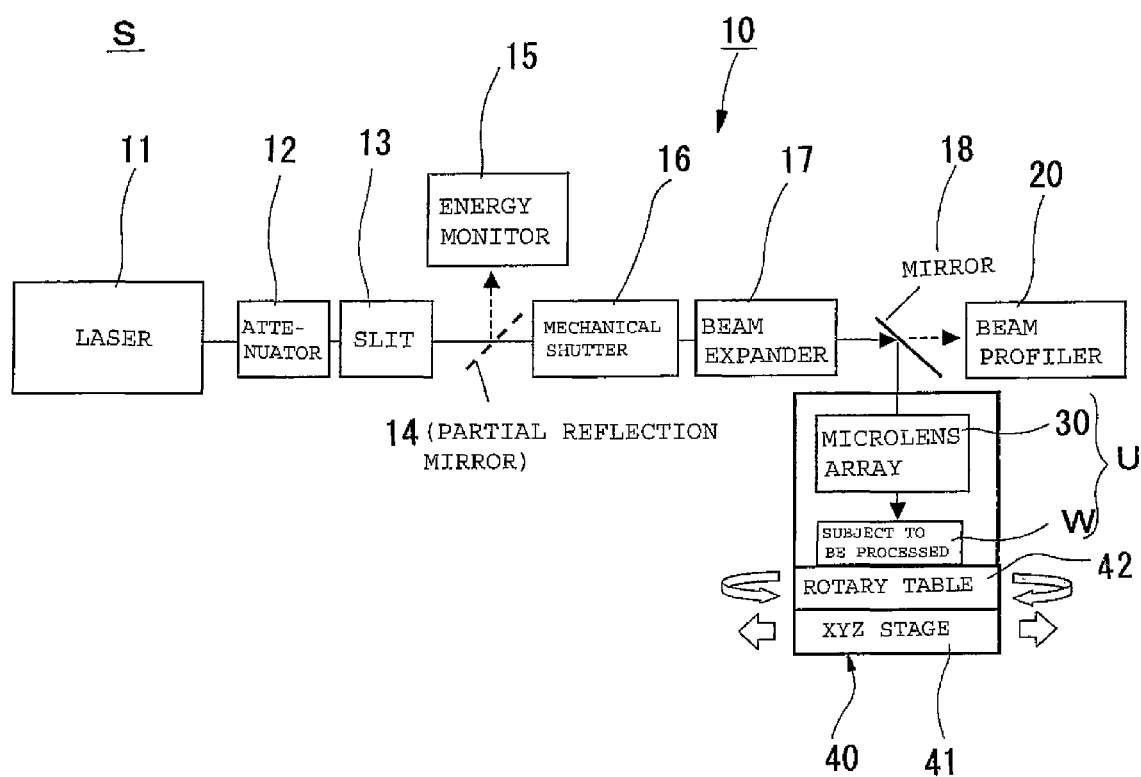
FIG. 18 is an explanatory view showing a configuration of a laser processing apparatus in accordance with example 2 of the present invention.

FIGS. 18 and 19 show the laser processing apparatus S in accordance with example 2. The laser processing apparatus S in accordance with example 2 is configured so that a rotary table 42 is provided on the stage 41 as the work adjusting means 40 for the subject W to be processed in the same configuration as that of example 1.

In this example, as shown in FIG. 18, the unit U in which the microlens array 30 and the subject W to be processed are integrated scans the beam area B by changing the angle with respect to the optical axis direction of irradiation beams.

As one of the characteristics of the excimer laser etc., the divergence angle of laser beam is sometimes changed by the time change of laser. In this case, the change usually occurs anisotropically in the longitudinal and transverse directions. Therefore, the processing point has a tendency to change into an elliptical shape.

However, in the configuration as shown in this example, since the unit U rotates, as shown on the right-hand side of FIG. 19, as the processing proceeds, the processing of a complete round shape is performed. According to this example, the processing point can be processed into a complete round shape regardless of the divergence angle of laser beams.

EXAMPLE 3

Figure 20:
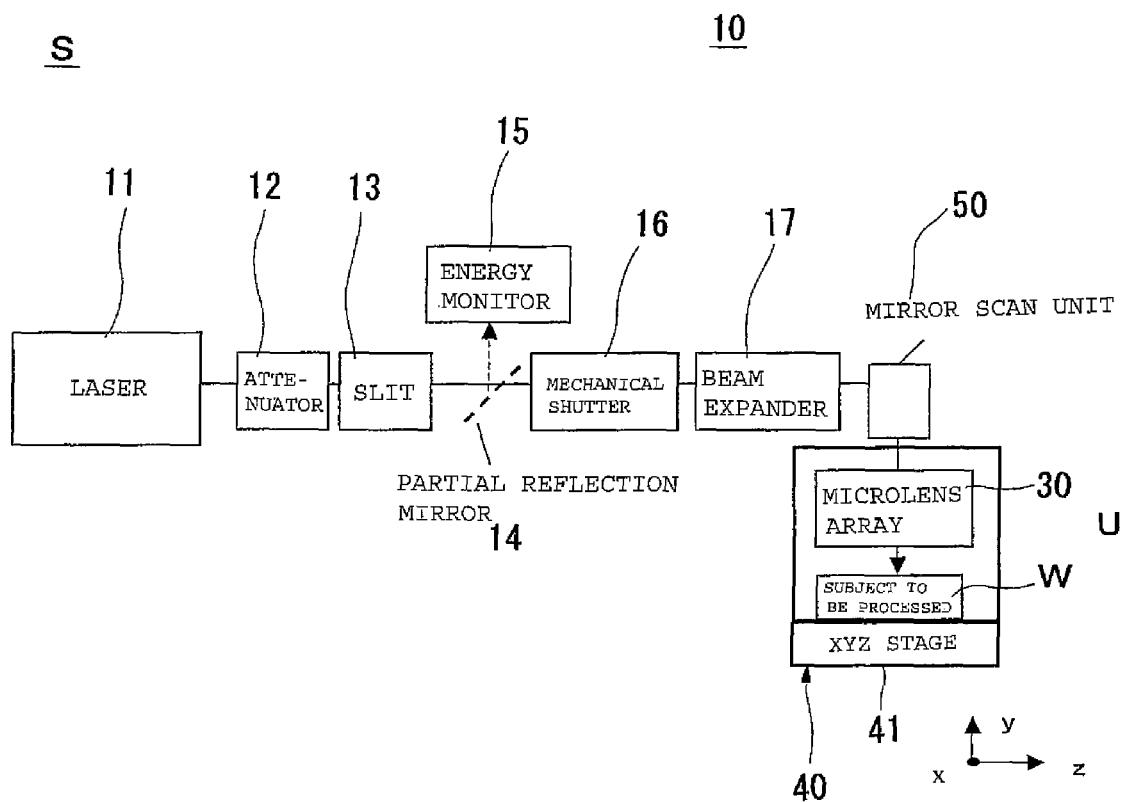
FIG. 20 is an explanatory view showing a configuration of a laser processing apparatus in accordance with example 3 of the present invention.

FIGS. 20 and 21 show the laser processing apparatus S in accordance with example 3. The laser processing apparatus S in accordance with example 3 is configured so that the configuration except the mirror 18 and the beam profiler 20 is the same as that of example 1, and a mirror scan unit 50 is provided in the configuration of example 1. The configuration of the mirror scan unit 50 is shown in FIG. 21. The mirror scan unit 50 includes a first mirror and a second mirror 52.

The first mirror 51 reflects light from the upper direction toward the lower direction in FIG. 21, and the second mirror 52 reflects light from the paper top surface direction toward the paper back surface direction in FIG. 21.

The first mirror 51 and the second mirror 52 can move in the respective arrow-mark direction in FIG. 16.

By driving these mirrors in association, scanning can be performed two-dimensionally over the microlenses 31.

However, for the moving mirror, mechanical angle fluctuations at the time of stage movement increase so that optical angle fluctuations due to mirror reflection are doubled.

In example 3, the stage 41, the first mirror 51, and the second mirror 52 may be driven in association with each other.

Alternatively, the configuration may be made such that at least one mirror is provided, and two-dimensional scanning of the unit U may be performed by a combination with the stage 41.

EXAMPLE 4

Figure 22:
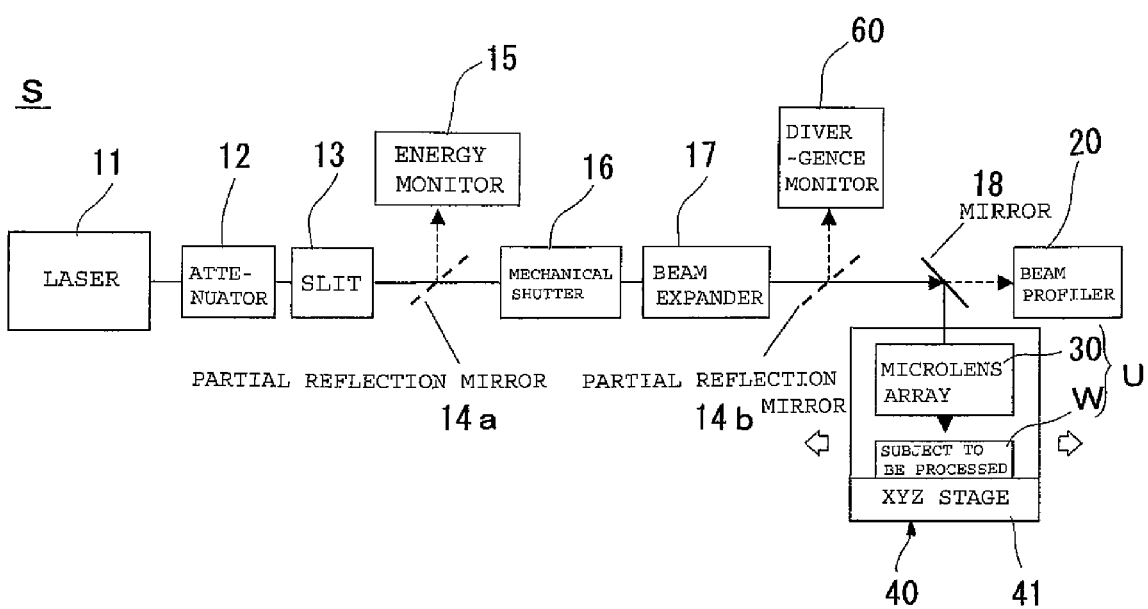
FIG. 22 is an explanatory view showing a configuration of a laser processing apparatus in accordance with example 4 of the present invention.
Figure 23:
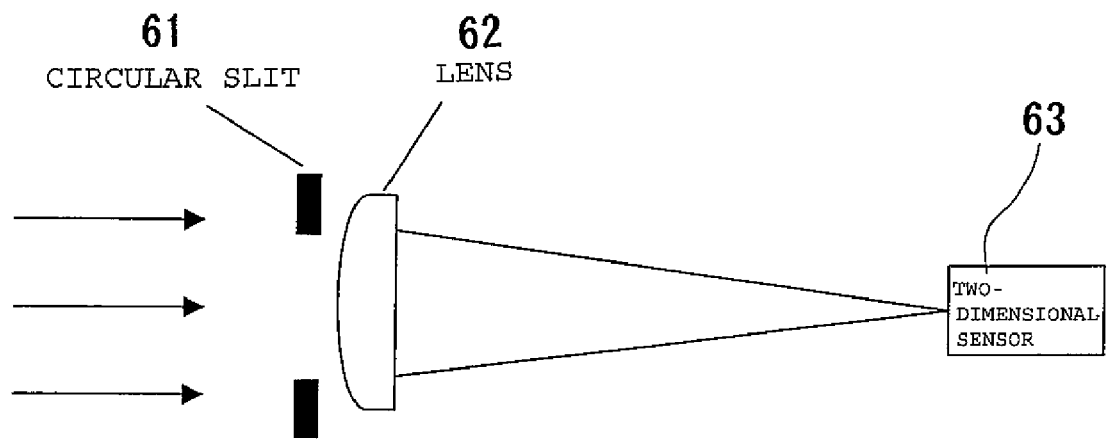
FIG. 23 is an explanatory view showing a configuration of a divergence monitor in example 4.
Figure 24:
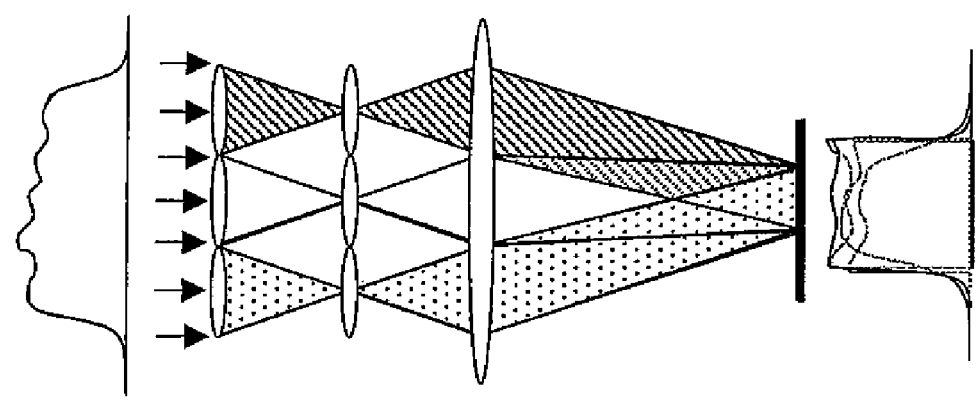
FIG. 24 is an explanatory view showing one example of a beam homogenizer of the conventional art.
Figure 28:
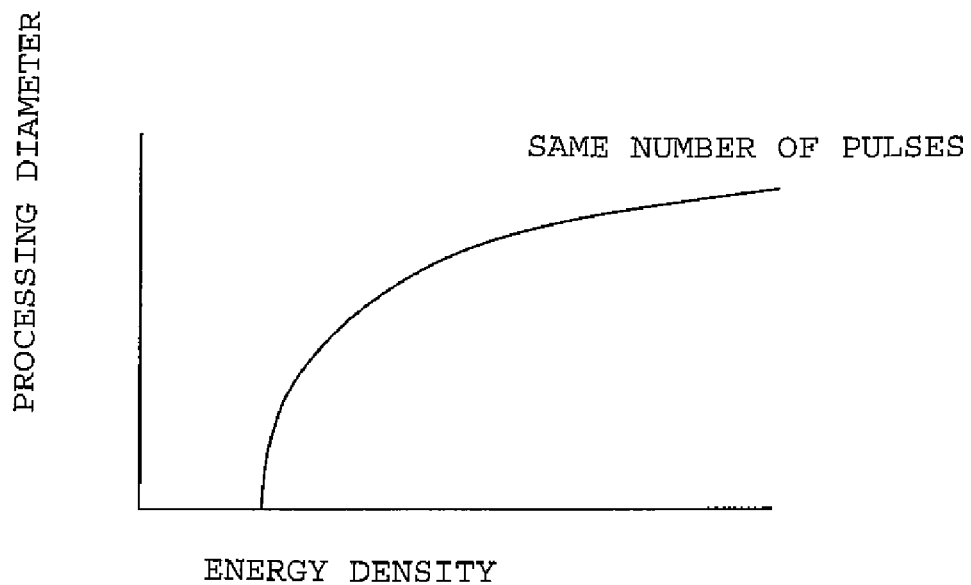
FIG. 28 is a graph showing the correlation between irradiation energy density and processing diameter.
Figure 29:
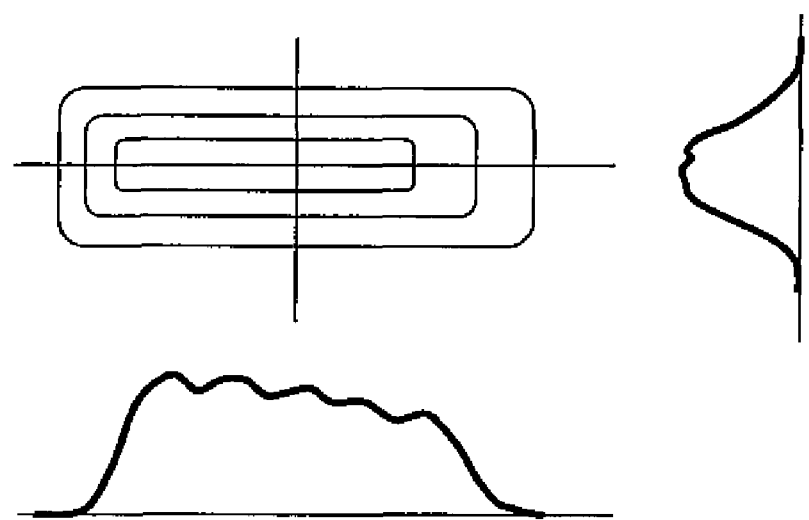
FIG. 29 is an explanatory view showing a beam profile of excimer laser.
Figure 30:
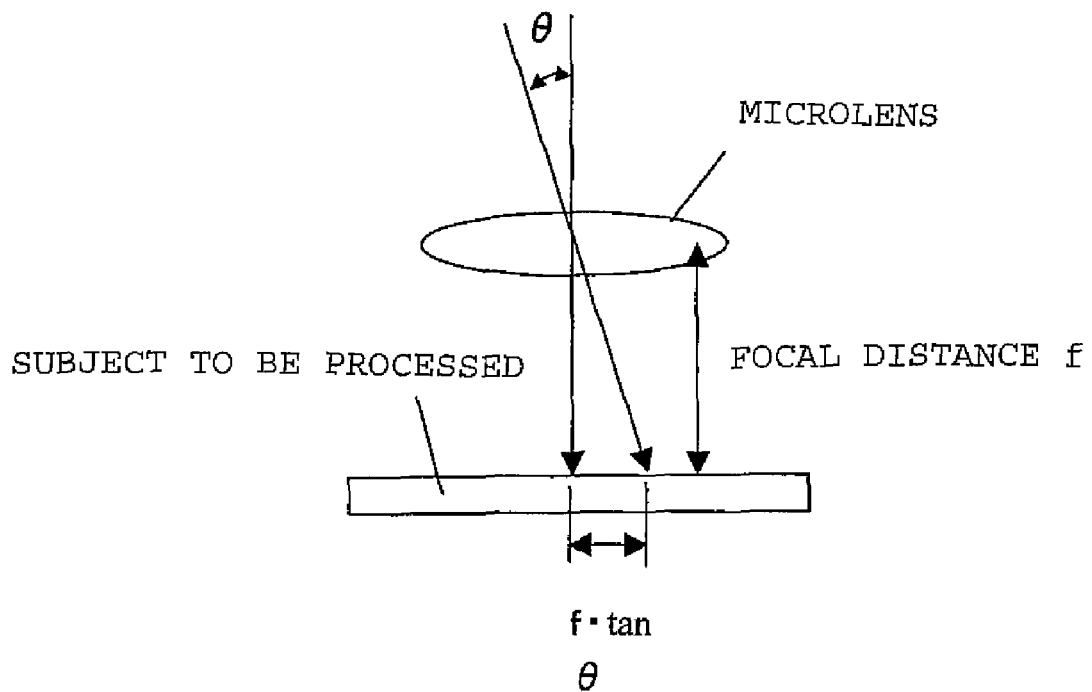
FIG. 30 is an explanatory view showing a shift of focusing position caused by an incident angle.

FIGS. 22 and 23 show the laser processing apparatus S in accordance with example 4. The laser processing apparatus S in accordance with example 4 is configured so that a divergence monitor 60 for monitoring a change in divergence angle of laser beams is provided in the same configuration as that of example 1.

The laser processing apparatus S in accordance with example 4 includes a partial reflection mirror 14a that reflects laser beams to the energy monitor 15 and a partial reflection mirror 14b that reflects laser beams to the divergence monitor 60.

In this example, the divergence monitor 60 monitors the divergence angle of laser beam, and if a change occurs in the magnitude of divergence angle, the zoom mechanism 17a (refer to FIG. 2) of the beam expander 17 is adjusted so that the divergence angle of laser beams applied to the microlens array 31 is kept constant.

FIG. 23 is an explanatory view showing the general configuration of the divergence monitor 60.

The divergence monitor 60 of this example is configured so as to condense the beams taken out by the partial reflection mirror 14b at the rear stage of the beam expander 17 with a lens 62 having a long focal length immediately after the beams have passed through a circular slit 61, and make measurement by arranging a two-dimensional sensor 63 for measuring the beam intensity distribution at the focal point position. In place of the two-dimensional sensor 63, a one-dimensional line sensor may be provided in each of two directions intersecting at right angles.

If the expander ratio is adjusted in the zoom mechanism 17a of the beam expander 17 so that the measured beam intensity distributions are equalized, the divergence angle of laser beams can be equalized in the longitudinal and transverse directions. For example, a publicly known technique is used for adjusting the expander ratio, and, for example, the distance between the lenses is adjusted.

The beam intensity distribution at the focal point position due to lens condensation is an intensity distribution obtained by multiplying the intensity distribution due to diffraction by the intensity distribution due to the influence of the divergence angle of laser beam. The intensity distribution due to diffraction depends on the wavelength, the diameter of beams incident on the lens, and the focal length of the lens, and the intensity distribution due to the influence of the divergence angle of laser beams depends on the divergence angle and the focal distance of the lens. Therefore, it is effective to "make measurement with a beam expansion ratio used for processing" and to "align the diameter of beams incident on the lens in the longitudinal and transverse directions".

The zoom mechanism 17a of the beam expander 17 is equipped with an automatic zoom adjusting mechanism, and the divergence monitor 60 and the zoom mechanism 17a are operated in association with each other, by which the divergence angle of laser beams can be adjusted automatically. For example, the configuration is made such that to move the lens of the zoom mechanism, an automatic stage of one or more axes is provided.

The invention claimed is:

1. A laser processing apparatus for processing a multitude of portions to be processed in an area to be processed in a subject to be processed, comprising
   a laser device;
   a focusing or imaging means for simultaneously outputting multiple laser beams using a laser beam emitted from the laser device; and
   a position adjusting mechanism configured to adjust a position of the subject to be processed,
   wherein:
   the laser devise emits the laser beam in a beam area that comprises the area to be processed and an area outside the area to be processed;
   the position adjusting mechanism is configured to move a unit from outside to inside of the beam area and passes the unit through the beam area, wherein the unit comprises the subject to be processed and said unit also comprises the focusing or imaging means, the subject and the focusing or imaging means being moved in a manner in a fixed relation to each other so that cumulative laser beam irradiation time during the processing of each of the multitude of portions to be processed is equalized; and
   the laser processing apparatus processes the subject to be processed while the position adjusting mechanism relatively moves the subject to be processed and the focusing or imaging means in relation to the laser beam.

2. The apparatus of claim 1, wherein the multiple laser beams output perform at least one of drilling, focusing, annealing, etching, doping and film formation at multiple points simultaneously.

3. A laser processing apparatus for processing a multitude of portions to be processed in an area to be processed in a subject to be processed, comprising
   a laser device;
   a focusing or imaging means for simultaneously outputting multiple laser beams using a laser beam emitted from the laser device; and
   a position adjusting mechanism configured to adjust a position of the subject to be processed,
   wherein:
   the laser devise emits the laser beam in a beam area that comprises the area to be processed and an area outside the area to be processed;
   the position adjusting mechanism moves the focusing or imaging means within the beam area relative to the subject to be processed, and said position adjusting mechanism moves the focusing or imaging means from the area to be processed to another area to be processed in the subject to be processed so that cumulative laser beam irradiation time during the processing of each of the multitude of portions to be processed is equalized, and
   the laser processing apparatus processes the subject to be processed while the position adjusting mechanism relatively moves the focusing or imaging means to the laser beam.

4. The laser processing apparatus according to claim 1 or 3, wherein the relative shift of the laser beams with respect to the focusing or imaging means during processing is two-dimensional or three-dimensional.

5. The laser processing apparatus according to claim 1 or 3, wherein the apparatus further comprises a rotating mechanism for rotating the position adjusting mechanism and the focusing or imaging means for the laser beams with the optical axis direction of the laser beams being the axis.

6. The laser processing apparatus according to claim 1 or 3, wherein the apparatus further comprises two independent beam expanders that independently change beam sizes along two axes in a plane normal to the laser beam direction and make the principal rays parallel, and at least one of the two beam expanders is provided with a zoom mechanism.

7. The laser processing apparatus according to claim 1 or 3, wherein the apparatus further comprises a monitor device for monitoring the divergence angle of laser beams having passed through a beam expander, and a control mechanism for keeping the divergence angles of the laser beams along two axes in a plane normal to the laser beam direction at a fixed ratio by using a zoom mechanism provided in the beam expander.

8. A laser processing method for processing a multitude of portions to be processed in an area to be processed in a subject to be processed, having a laser device; a focusing or imaging means for simultaneously outputting multiple laser beams using a laser beam emitted from the laser device; and a position adjusting mechanism for adjusting a position of the subject to be processed, and comprising:
   a first step in which the subject to be processed is fixed as a unit to the focusing or imaging means; and
   a second step in which the position adjusting mechanism moves the unit from outside to inside of a beam area and passes the unit through the beam area, wherein the beam area comprises the area to be processed and an area outside the area to be processed and wherein the laser devise emits the laser beam in the beam area;

wherein:

the position adjusting mechanism moves the unit so that cumulative laser beam irradiation time during the processing of each of the multitude of portions to be processed is equalized and that the subject to be processed is processed while the subject to be processed and the focusing or imaging means are relatively moved to the laser beam in the second step.

9. The method of claim 8, wherein the multiple laser beams output perform at least one of drilling, focusing, annealing, etching, doping and film formation at multiple points simultaneously.

10. A laser processing method for processing a multitude of portions to be processed in an area to be processed in a subject to be processed, having a laser device; a focusing or imaging means for simultaneously outputting multiple laser beams using a laser beam emitted from the laser device; and a position adjusting mechanism for adjusting a position of the subject to be processed, and comprising:

a first step in which the position adjusting mechanism moves the focusing or imaging means within a beam area relative to the subject to be processed, and from the area to be processed to another area to be processed in the subject to be processed, wherein the beam area comprises the area to be processed and an area outside the area to be processed and wherein the laser devise emits the laser beam in the beam area; and a second step in which while the subject to be processed is moved relative to at least one of and the focusing or imaging means are moved, the subject to be processed is processed so that cumulative laser beam irradiation time during the processing of each of the multitude of portions to be processed is equalized while the focusing or imaging means are relatively moved to the laser beam.

11. The laser processing method according to claim 8 or 10, wherein the relative shift of the laser beams with respect to the focusing or imaging means during processing in the second step is two-dimensional or three-dimensional.

12. The laser processing method according to claim 8 or 10, wherein the method comprises a step of rotating the subject to be processed and the focusing or imaging means with the optical axis direction of the laser beams being the axis in the second step.

* * * * *